(12) United States Patent
Watts et al.

(10) Patent No.: US 7,941,014 B1
(45) Date of Patent: May 10, 2011

(54) OPTICAL WAVEGUIDE DEVICE WITH AN ADIABATICALLY-VARYING WIDTH

(75) Inventors: Michael R. Watts, Albuquerque, NM (US); Gregory N. Nielson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 317 days.

(21) Appl. No.: 12/146,965

(22) Filed: Jun. 26, 2008

Related U.S. Application Data

(63) Continuation-in-part of application No. 12/100,004, filed on Apr. 9, 2008, now Pat. No. 7,616,850.

(51) Int. Cl.
   *G02F 1/035* (2006.01)
   *G02B 6/26* (2006.01)
(52) U.S. Cl. ............... 385/32; 385/2; 385/43; 385/50
(58) Field of Classification Search .......... 385/2, 32, 385/50
   See application file for complete search history.

(56) References Cited

U.S. PATENT DOCUMENTS

| | | | |
|---|---|---|---|
| 6,849,914 B2 * | 2/2005 | Day | 257/431 |
| 2005/0089263 A1 * | 4/2005 | Wessel et al. | 385/14 |
| 2009/0263078 A1 * | 10/2009 | Hosomi et al. | 385/14 |

OTHER PUBLICATIONS

Paivi Heimala et al, "Thermally Tunable Integrated optical Ring Resonator with Poly-Si Thermistor", Journal of Lightwave Technology, vol. 14, No. 10, Oct. 1996, pp. 2260-2267.

D. K. Armani et al, "Ultra-high-Q toroid microcavity on a chip", Nature, vol. 421, Feb. 27, 2003, pp. 925-928.

Qianfan Xu et al, "Micrometre-scale silicon electro-optic modulator", Nature, vol. 435, May 19, 2005, pp. 325-327.

F. Gan et al, "Maximizing the Thermo-Optic Tuning Range of Silicon Photonic Structures", Proceedings of the International Conference on Photonics in Switching, 2007, Aug. 19-22, 2007, pp. 67-68.

Michael R. Watts, et al "Maximally Confined High-Speed Second-Order Silicon Microdisk Switches," Paper Presented at Optical Fiber Communications Conference (OFC 2008), San Diego, CA, Feb. 24-28, 2008.

* cited by examiner

*Primary Examiner* — Jerry T Rahll
(74) *Attorney, Agent, or Firm* — Olivia J. Tsai

(57) ABSTRACT

Optical waveguide devices are disclosed which utilize an optical waveguide having a waveguide bend therein with a width that varies adiabatically between a minimum value and a maximum value of the width. One or more connecting members can be attached to the waveguide bend near the maximum value of the width thereof to support the waveguide bend or to supply electrical power to an impurity-doped region located within the waveguide bend near the maximum value of the width. The impurity-doped region can form an electrical heater or a semiconductor junction which can be activated with a voltage to provide a variable optical path length in the optical waveguide. The optical waveguide devices can be used to form a tunable interferometer (e.g. a Mach-Zehnder interferometer) which can be used for optical modulation or switching. The optical waveguide devices can also be used to form an optical delay line.

23 Claims, 10 Drawing Sheets

Section 1 - 1

Section 2 - 2

Section 3 - 3

Section 4 - 4

Section 5 - 5

Section 6 - 6

Section 7 - 7

OPTICAL WAVEGUIDE DEVICE WITH AN ADIABATICALLY-VARYING WIDTH

CROSS REFERENCE TO RELATED APPLICATIONS

This is a continuation-in-part of application Ser. No. 12/100,004, filed Apr. 9, 2008 now U.S. Pat. No. 7,616,850.

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to photonic integrated circuits, and in particular to optical waveguide devices containing a waveguide bend or a ring resonator which has an adiabatically-varying width to allow for a mechanical or an electrical connection to be made without substantially perturbing the transmission of light therein. The optical waveguide devices of the present invention can be used, for example, to form interferometers, phase shifters, delay lines, filters, modulators and switches.

BACKGROUND OF THE INVENTION

Optical waveguide devices can be used as optical phase shifters and delay lines and can also be used to filter, modulate and switch optical signals. Mechanical and/or electrical contacts to optical waveguide devices are essential for many applications. Such contacts, however, can perturb the resonant modes of light being transmitted in the optical waveguide devices; and this can result in propagation losses of the light in these devices. In a microring resonator, the reduction of a quality factor, Q, in the microring resonator will limit the utility of the resonator for many applications including communications where a large resonator Q is needed for narrowband filtering, switching, or modulation. In other types of optical waveguide devices including interferometers, phase shifters and delay lines, propagation losses can also occur from electrically contacting an optical waveguide therein. What is needed is a way of making low-loss mechanical and electrical connections to optical waveguide devices which does not introduce any appreciable propagation loss.

The present invention provides a solution to these needs by providing optical waveguide devices in which mechanical and/or electrical contacts are made from inside of each optical ring resonator therein so that the Q of each ring resonator is preserved and so that the size of each ring resonator can be reduced to as small as 2-3 µm radius.

The present invention also provides a solution to electrically contacting waveguide devices which do not employ an optical ring resonator, by providing a waveguide bend (also termed a microbend) in an optical waveguide, with the waveguide bend varying adiabatically in width between a minimum value of the width and a maximum value thereof. By contacting the optical waveguide at a location near the maximum value of the width, the modes of light therein will not be substantially perturbed. This allows either an electrical heater or a semiconductor junction to be located inside the waveguide bend for use in varying an effective index of refraction of the optical waveguide and thereby changing an optical path length or phase delay of the light therein. This is useful, for example, to form a tunable interferometer (e.g. a Mach-Zehnder interferometer), or to form an optical delay line.

In an optical waveguide devices formed according to the present invention with a ring resonator, the optical waveguide used to form the ring resonator can similarly have a non-uniform width which adiabatically varies between a maximum value and a minimum value. By mechanically or electrically contacting the ring resonator from the inside thereof at a location near the maximum value of the width, the resonant modes of the light circulating in the optical waveguide ring are not substantially perturbed. This allows either an electrical heater or a semiconductor junction to be located inside the ring resonator for use in varying (i.e. tuning) a resonant frequency therein while maintaining a high resonator Q.

The optical waveguide devices of the present invention can be formed from silicon using conventional silicon integrated circuit (IC) processes. This allows one or more of the devices of the present invention to be co-located on a conventional silicon-on-insulator substrate together with integrated electronic circuitry to provide a capability for optical phase shifting, signal routing, switching, filtering and detection.

These and other advantages of the present invention will become evident to those skilled in the art.

SUMMARY OF THE INVENTION

The present invention relates to an optical waveguide apparatus which comprises an optical waveguide having a waveguide bend therein, with the waveguide bend having a width which adiabatically varies with distance between a minimum value of the width proximate to a pair of opposite ends of the waveguide bend and a maximum value of the width proximate to a midpoint of the waveguide bend; and at least one connecting member attached to the waveguide proximate to the midpoint of the waveguide bend. An impurity-doped region can be formed within the optical waveguide at a location proximate to the maximum value of the width of the waveguide bend to change an effective index of refraction within the waveguide bend in response to a voltage applied to the impurity-doped region. The optical waveguide can be used to form an optical delay line. Another optical waveguide can be provided in the apparatus to form an interferometer (e.g. a Mach-Zehnder interferometer) with the impurity-doped region providing a variable phase delay in the interferometer to provide for a modulation or switching of light.

In certain embodiments of the present invention, the impurity-doped region can form an electrical heater which can be used to change the effective index of refraction within the waveguide bend via a thermo-optic effect. In other embodiments of the present invention, the impurity-doped region can comprise an n-type-doped region and a p-type-doped region to form a semiconductor junction which can be used to change the effective index of refraction within the waveguide bend via an injection or depletion of carriers (i.e. electrons and holes) in the waveguide bend. A pair of electrical contacts can be provided in the apparatus to supply the voltage to the impurity-doped region.

The optical waveguide can comprise monocrystalline silicon or silicon nitride, and can be supported on a substrate. In some embodiments of the present invention, the optical waveguide can be supported above the substrate on a pedestal; whereas in other embodiments of the present invention the optical waveguide can be located within a low-thermal-conductivity material. The substrate can comprise a siliconon-insulator substrate which further comprises a monocrystalline silicon body and a monocrystalline silicon layer sandwiched about a silicon oxide layer, with the optical waveguide being formed from the monocrystalline silicon layer.

The present invention also relates to an optical waveguide apparatus which comprises a substrate; an optical waveguide supported on the substrate, with the optical waveguide having a waveguide bend therein, and with the waveguide bend having a width which varies adiabatically with distance along the waveguide bend between a minimum value of the width and a maximum value of the width; an impurity-doped region located within the waveguide bend at a location proximate to the maximum value of the width of the waveguide bend and proximate to an inner sidewall of the waveguide bend; and a pair of electrical contacts connected to the impurity-doped region to provide a voltage thereto to change an effective index of refraction of light within the waveguide bend.

The impurity-doped region can either form an electrical heater, or can comprise a p-type-doped region and an n-type-doped region to form a semiconductor junction. When the p-type-doped region and the n-type-doped region are superposed one above the other, a vertical semiconductor junction will be formed. When the p-type-doped region and the n-type-doped region are spaced longitudinally along the waveguide bend, a horizontal semiconductor junction will be formed. In some embodiments of the present invention, another optical waveguide can be provided in the apparatus, with the two optical waveguides being optically coupled together to form an interferometer.

The optical waveguide can comprise monocrystalline silicon or silicon nitride. The substrate can comprise a silicon-on-insulator substrate which further comprises a monocrystalline silicon body and a monocrystalline silicon layer sandwiched about a silicon oxide layer, with the optical waveguide being formed from the monocrystalline silicon layer.

The present invention further relates to an optical waveguide apparatus which comprises a pair of optical waveguides that are optically coupled together to form an interferometer. At least one of the pair of optical waveguides has a waveguide bend therein with a width that varies adiabatically with distance between a minimum value and a maximum value. One or both of the optical waveguides in the interferometer can include an impurity-doped region formed therein. The impurity-doped region is formed at a location proximate to the maximum value of the width of the waveguide bend and extends partway into the waveguide bend from an inner sidewall of the waveguide bend. A pair of electrical contacts are provided which are connected to the impurity-doped region to provide a variable phase shift in the interferometer in response to a voltage applied to the impurity-doped region.

The pair of optical waveguides can be supported on a substrate; and each optical waveguide can comprise monocrystalline silicon or silicon nitride. In certain embodiments of the present invention, the pair of the optical waveguides are supported within a low-thermal-conductivity material. The impurity-doped region forms either an electrical heater, or can include an n-type-doped region and a p-type-doped region to form a semiconductor junction.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1A:
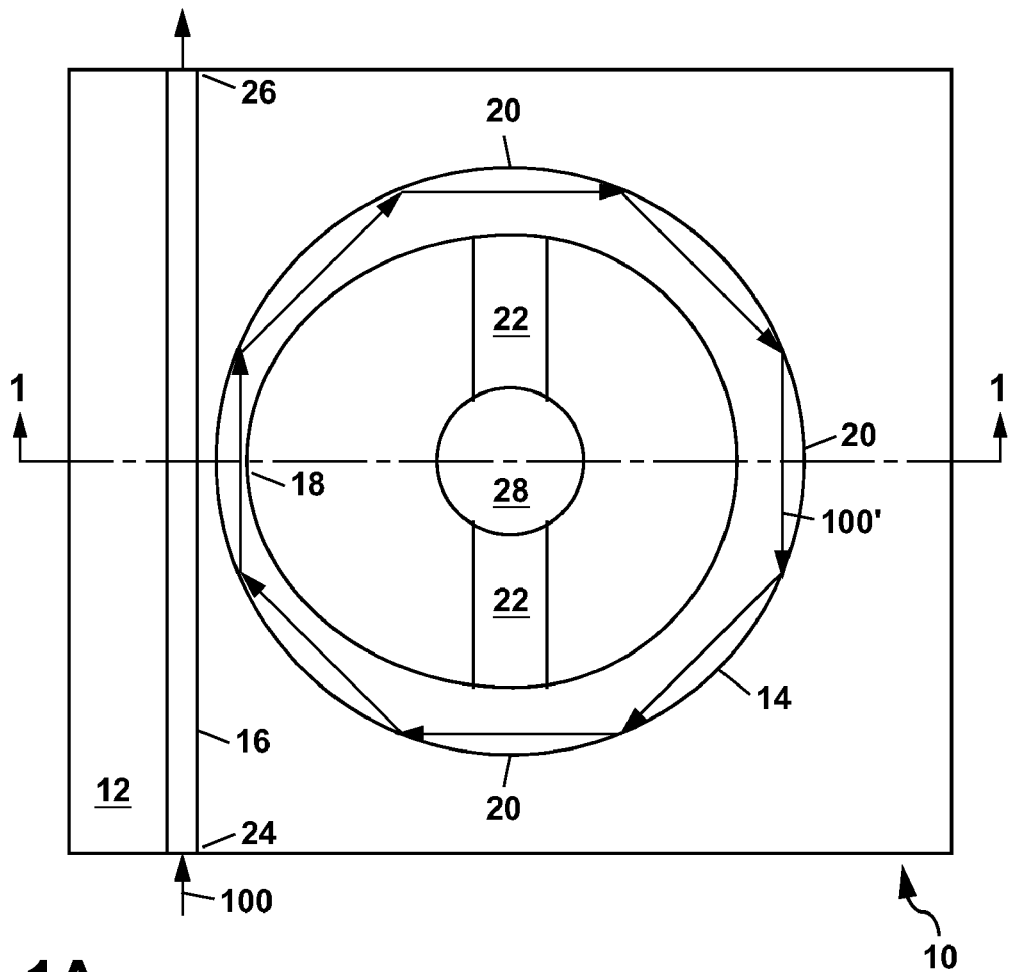
FIG. 1A shows a schematic plan view of a first example of an optical waveguide apparatus according to the present invention.

The optical waveguide devices of the present invention can be formed as either optical ring resonators or optical waveguides having a waveguide bend therein. A series of examples of optical ring resonators will first be presented to illustrate the present invention. This will be followed by a series of examples of optical waveguide devices which do not include an optical ring resonator with a closed-loop optical path, but which instead utilize a curved portion of an open-loop optical waveguide which is referred to herein as a waveguide bend (also termed a microbend).

Referring to FIG. 1, there is shown a first example of an optical waveguide apparatus 10 according to the present invention. This device 10 comprises a substrate 12 on which an optical waveguide ring 14 (also referred to herein as an optical ring resonator or simply as a ring resonator) is supported. An optical waveguide 16 is also provided on the substrate 12 to evanescently couple light between the optical waveguide 16 and the optical waveguide ring 14.

The substrate 12 can comprise, for example, a monocrystalline silicon substrate, or a monocrystalline silicon body of a silicon-on-insulator (SOI) substrate. The optical waveguide ring 14 and the optical waveguide 16 can comprise, for example, silicon (i.e. monocrystalline silicon) or silicon nitride.

Figure 1B:
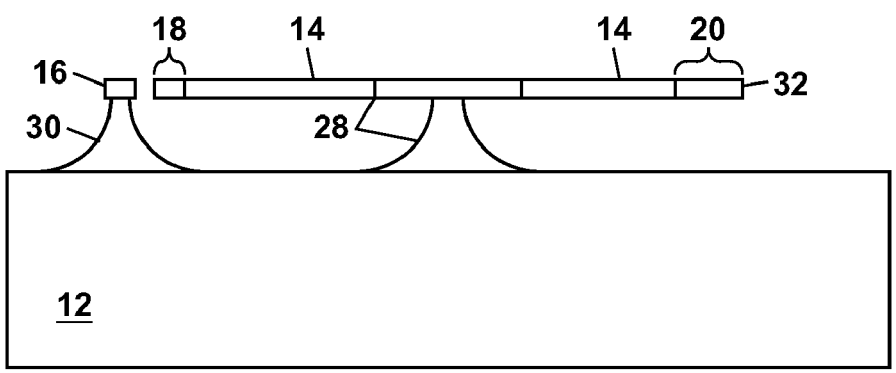
FIG. 1B shows a schematic cross-section view of the device of FIG. 1A along the section line 1-1 in FIG. 1A.

In the example of FIGS. 1A and 1B, the optical waveguide ring 14 has a non-uniform width which adiabatically varies between a minimum value 18 (also termed a minimum width) and a maximum value 20 (also termed a maximum width). The minimum width 18 occurs at a location near the optical waveguide 16 and can be, for example, the same width as the optical waveguide 16. The maximum width 20 occurs away from the optical waveguide 16 at a location where one or more connecting members 22 can be provided to suspend the optical waveguide ring 14 above the substrate 12.

In the device 10 of FIGS. 1A and 1B, light 100 can be coupled into the optical waveguide at an input port 24 and transmitted to an output port 26. A portion 100' of the light 100 at a resonant frequency of the optical waveguide ring 14 (also referred to herein as resonant light) will also be coupled between the optical waveguide 16 and the optical waveguide ring 14 which acts as an optical ring resonator. This resonant light 100' circulates around the optical waveguide ring 14 in a so-called "whispering gallery" mode which is characterized by multiple reflections of the resonant light 100' off an outer sidewall 32 of the optical waveguide ring 14 as shown in FIG. 1A. The resonant frequency will depend upon the circumference of the optical waveguide ring 14.

Selecting the minimum width 18 of the optical waveguide ring 14 can be used to restrict the resonant light 100' to a fundamental "whispering gallery" mode of oscillation and thereby prevent the occurrence of any higher-order "whispering gallery" modes. Oscillation in the fundamental "whispering gallery" mode is advantageous since this provides a maximum free-spectral-range (FSR) for a given size of the ring resonator 14 which is desirable for most applications.

If the optical waveguide ring 14 in the example of FIG. 1 were to be made with a uniform width throughout corresponding to the minimum width 18, there would be a substantial loss in transmission of the resonant light 100' at the location of each connecting member 22 due to a discontinuity in the waveguide of the ring 14 which would perturb the light 100' circulating around the ring 14. This loss at the location of each connecting member 22 in a uniform width optical waveguide ring formed of monocrystalline silicon, as simulated with a Finite-Difference Time-Domain simulation, can be about 36% for a waveguide ring with a uniform width of 0.5 μm and an outer radius of 3 μm. In such a uniform-width ring resonator, the calculated Q would be reduced to less than 2000.

On the other hand, by forming the optical waveguide ring 14 as shown in FIGS. 1A and 1B with a non-uniform width which is adiabatically (i.e. smoothly) transitioned between the minimum width 18 and the maximum width 20 which is about twice the minimum width 18 and by placing the connecting members 22 at locations where the maximum width 20 occurs, the simulated transmission loss can be reduced to 0.1% for each connecting member 22. This essentially lossless contact between the connecting members 22 and the optical waveguide ring 14 maintains a high Q for the optical ring resonator 14 which can be about $10^6$. The large improvement in device performance according to the present invention occurs even though the resonant light 100' must undergo multiple adiabatic mode expansions and contractions as the resonant light 100' propagates due to the smoothly changing width of the optical waveguide ring 14. With the mode expansions occurring at the locations of the connecting members 22, the optical field of the light 100', although expanded, is located well away from an inner sidewall of the optical waveguide ring 14 so that there is substantially no interaction between the optical field and the connecting members 22.

The optical waveguide device 10 of FIGS. 1A and 1B provides an increased mechanical and thermal isolation from the substrate 12 since the connecting members 22 which can be made with a very small width. The connecting members 22 can also be made from a different material than the optical waveguide ring 14. As an example, when the optical waveguide ring 14 comprises silicon nitride, the connecting members 22 can comprise silicon dioxide or a silicate glass such as TEOS which can be deposited by chemical vapor deposition (CVD) from the thermal decomposition of tetraethyl orthosilicate. As another example, when the optical waveguide ring 14 comprises monocrystalline silicon, the connecting members 22 can be initially made from this same material and then thermally oxidized to completely convert the members 22 into silicon dioxide while only partially thermally oxidizing the optical waveguide ring 14 to form a silicon dioxide cladding about a waveguide core of monocrystalline silicon.

In the optical waveguide device 10 in the example of FIGS. 1A and 1B, the optical waveguide ring 14 is supported on a post 28 which can be formed, for example, of silicon nitride, silicon dioxide or a silicate glass such as TEOS. The optical waveguide 16 can also be supported on a pedestal 30 which can be formed of the same material as the post 28 which supports the optical waveguide ring 14.

The optical ring resonator device 10 of FIGS. 1A and 1B can be formed, for example, from a silicon-on-insulator (SOI) substrate. The SOI substrate comprises a monocrystalline silicon body which forms the substrate 12 in the completed device 10 of FIGS. 1A and 1B. The SOI substrate also comprises a monocrystalline silicon layer which can be used to form the optical waveguide 16, the optical waveguide ring 14, the connecting members 22 and a top portion of the post 28. The monocrystalline silicon layer can be, for example, about 0.25 μm thick when the light 100 is at a wavelength of about 1.5 μm. Sandwiched between the monocrystalline silicon body and the monocrystalline silicon layer is a silicon oxide layer which forms a bottom portion of the post 28 and the pedestal 30 as shown in FIG. 1B. The silicon oxide layer can be, for example, 1-3 μm thick.

To form the device 10 of FIGS. 1A and 1B on an SOI substrate, the various elements 14, 16, 22 and 28 can be photolithographically defined and reactive ion etched into the monocrystalline silicon layer. One or more oxidation steps can then be performed at an elevated temperature in the range of about 950-1100° C. to remove any etch damage on sidewalls of the waveguides 14 and 16 and thereby smooth the sidewalls to reduce a propagation loss of the light 100. These oxidation steps convert a thin (about 5 nanometers) exposed surface portion of the monocrystalline silicon layer used to form the optical waveguide 16 and the optical waveguide ring 14 to silicon dioxide. A timed isotropic wet etching step comprising hydrofluoric acid (HF) with an etch mask to control an extent of the etching can then be used to remove the silicon oxide layer of the SOI substrate from beneath the optical waveguide ring 14 while leaving a portion of this silicon oxide layer to form the lower portion of the post 28 and also to form the pedestal 30 beneath the optical waveguide 16.

When silicon nitride is used to form the optical waveguide ring 14 and optical waveguide 16, a similar fabrication process can be used with a silicon oxide layer (e.g. TEOS) blanket deposited over a silicon substrate 12 by CVD to a layer thickness which can be 1-3 µm followed by CVD deposition of a silicon nitride layer which can be about 0.25 µm thick. After photolithographic definition and reactive ion etching of the silicon nitride layer to form the waveguides 14 and 16, the connecting members 22 and the top portion of the post 28, an annealing step can be performed at a high temperature of 1050-1200° C. for up to several hours to improve the light transmission in the silicon nitride optical waveguide 16 and optical waveguide ring 14. Then, a timed isotropic wet etching step as described above can be used to remove the silicon oxide layer and define the lower portion of the post 28 and the pedestal 30.

The optical waveguide device 10 in the example of FIGS. 1A and 1B can be used to form an optical resonator or an optical filter with a resonant frequency which depends upon a circumference of the optical waveguide ring 14. The device 10 of FIGS. 1A and 1B can also be used to form a sensor since anything which changes the circumference of the optical waveguide ring 14 can be sensed as a change in the resonant frequency. Thus, for example, temperature can be sensed using the device of FIGS. 1A and 1B and measuring the resonant frequency of the optical waveguide ring 14 using the light 100. Any change in temperature will expand or contract the optical waveguide ring 14 and thereby change the resonant frequency of the light 100 which is coupled into the optical waveguide ring 14.

The term "optical ring resonator" as used herein is defined to be an optical resonator 14 which has a hard curved outer sidewall 32 and a closed-loop optical path for light circulating therein. Thus, the term "optical ring resonator" as defined herein includes open-ring resonators 14 which can have an annular shape which can be circular, elliptical or oval. The term "optical ring resonator" as defined herein also includes ring resonators 14 having a disk shape.

The term "hard" used herein with reference to the outer sidewall 32 is defined as an outer sidewall 32 which is vertical (i.e. substantially perpendicular to a plane of the substrate 12) without any steps in the outer sidewall 32 which are horizontal (i.e. substantially parallel to the plane of the substrate 12). Such a "hard" outer sidewall 32 can be formed by etching completely through a layer of a material (e.g. silicon or silicon nitride) wherefrom the optical ring resonator 14 is formed. A "hard" outer sidewall 32 is advantageous since it provides a maximum effective refractive index difference Δn between the material used to form the optical ring resonator 14 (e.g. silicon or silicon nitride) and a lower-index material (e.g. vacuum, a gas such as air or dry nitrogen, or a dielectric material such as silicon dioxide or a silicate glass) which is in contact with the outer sidewall 32 of the optical ring resonator 14. With a hard curved outer sidewall 32 for the optical ring resonator 14, a propagation loss of the light 100 within the resonator 14 is minimized so that the size of the resonator 14 can be made very small (e.g. as small as 2-3 µm radius when the resonator 14 is formed from monocrystalline silicon).

Figure 2A:
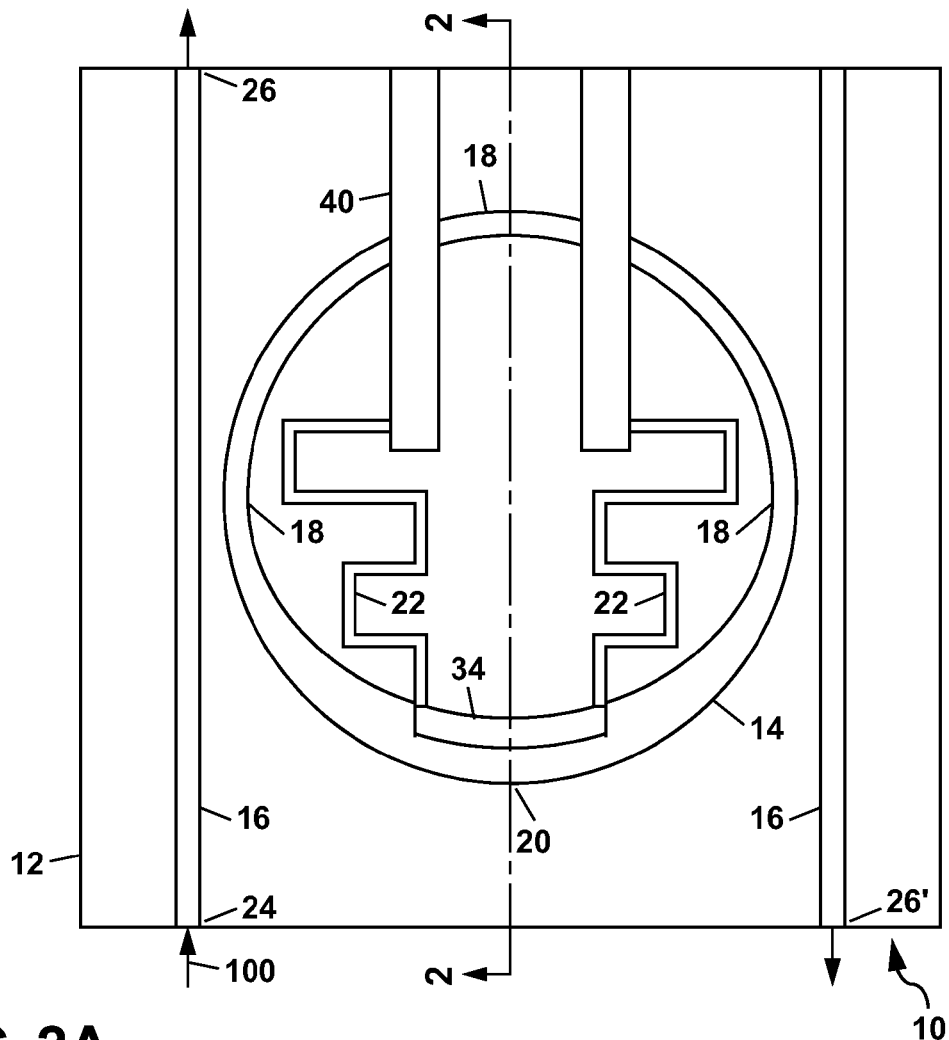
FIG. 2A shows a schematic plan view of a second example of an optical waveguide apparatus according to the present invention.
Figure 2B:
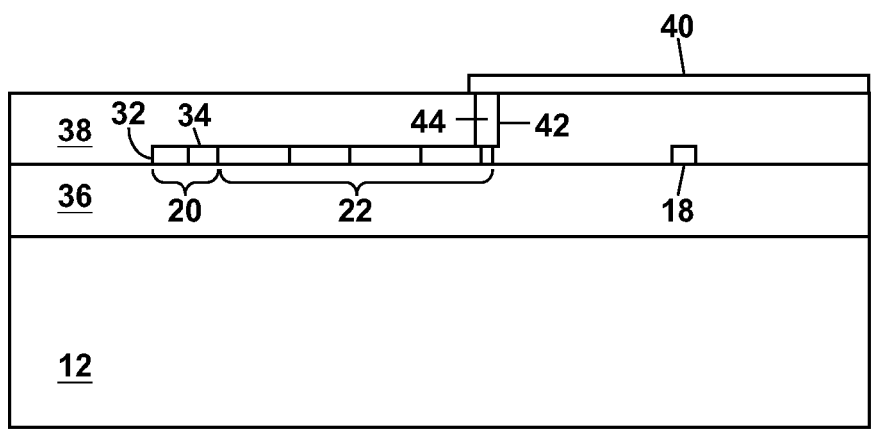
FIG. 2B shows a schematic cross-section view of the device of FIG. 2A along the section line 2-2 in FIG. 2A.

FIGS. 2A and 2B schematically illustrate a second example of an optical waveguide apparatus 10 formed according to the present invention. In this example of the present invention, an optical waveguide ring 14 is supported on a substrate 12 with a pair of optical waveguides 16 evanescently coupled to the optical waveguide ring 14 at a location near a minimum width 18 of the optical waveguide ring 14. In this embodiment, one half of the circumference of the optical waveguide ring 14 has the minimum width 18; and the other half of the circumference of the optical waveguide ring 14 has a width which adiabatically increases to a maximum width 20 which can be about twice the minimum width 18 or more.

An electrical heater 34 is located within the optical waveguide ring 14 proximate to the location of the maximum width 20 thereof. By locating the electrical heater 34 near the maximum width 20 of the optical waveguide ring 14 and on an inside edge thereof, any perturbation of the "whispering gallery" mode in the optical resonator 14 produced by the heater 34 and the connecting members 22, which are used to supply electrical power to the heater 34, is minimized so that a relatively large resonator Q of up to about $10^6$ can be maintained in the optical ring resonator device 10. In other embodiments of the present invention, the electrical heater 34 can extend into the minimum width 18 of the optical waveguide ring 14, although this may reduce the resonator Q depending upon a doping level of the ring 14 which is used to form the heater 34.

The electrical heater 34 can comprise an impurity-doped region when the optical waveguide ring 14 is formed from monocrystalline silicon. The impurity-doped region is a region of the monocrystalline silicon which has been doped (e.g. by ion implantation) to a doping concentration generally in the range of $10^{17}$-$10^{19}$ cm$^{-3}$ with a semiconductor impurity dopant such as boron (B), phosphorous (P) or arsenic (As). This makes the impurity-doped region electrically resistive. When a voltage is applied between opposite ends of the electrical heater 34, heat will be generated directly within the impurity-doped region of the optical waveguide ring to directly heat the ring 14. This heating of the optical waveguide ring 14 changes an effective index of refraction therein via a thermo-optic effect so that an effective optical path for the light 100' circulating around the optical waveguide ring 14 is increased; and this changes the resonant frequency of the light 100' in the ring 14. In monocrystalline silicon, the thermo-optic coefficient do/dT is relatively large (dn/dT=$2.2 \times 10^{-4 \circ}$ C.$^{-1}$) so that for a temperature change ΔT=400° C. between "on" and "off" states of the heater 34, an index change Δn=(dn/dT)ΔT=0.09 will be produced.

In the example of FIGS. 2A and 2B, electrical power can be supplied to the heater 34 through a pair of connecting members 22 which act as electrical contacts to the heater 34. The pair of connecting members 22 are both located inside of the optical waveguide ring 14 and can be formed from monocrystalline silicon (i.e. a part of the monocrystalline silicon layer of an SOI substrate) which has been doped with a higher level of impurity doping (e.g. $10^{19}$-$10^{21}$ cm$^{-3}$ with B, P or As) than the electrical heater 34 to provide a much lower resistivity so that the heat generation occurs primarily in the electrical heater 34 and not in the connecting members 22. Additionally, to minimize the conduction of heat from the electrical heater 34 through the connecting members 22, the members 22 can be made relatively long and folded to fit inside the optical waveguide ring 14 (see FIG. 2A).

In the example of FIGS. 2A and 2B, the optical waveguide ring 14 and optical waveguides 16 can be supported above the substrate 12 on a layer 36 of a low-thermal-conductivity material such as silicon dioxide or a silicate glass (e.g. TEOS). When the device 10 of FIGS. 2A and 2B is formed using a SOI substrate, the substrate 12 can comprise the monocrystalline silicon body of the SOI substrate, the layer 36 can comprise the silicon oxide layer of the SOI substrate, and the various elements 14, 16, 22 and 34 can all be formed from the monocrystalline silicon layer of the SOI substrate with appropriate impurity doping as described above.

A second layer 38 of a low-thermal-conductivity material such as silicon dioxide or a silicate glass (e.g. TEOS) can be deposited over the optical waveguide ring 14 and optical waveguides 16 as shown in FIG. 2B. This second layer 38, which can be deposited by CVD, is useful to encapsulate the elements 14, 16, 22 and 34 and also to provide a support for wiring 40 (e.g. comprising aluminum) which can be used to supply electrical power to the heater 34. The second layer 38 supports the wiring 40 at a height of generally about 1 μm or more above the optical waveguides 16 and optical waveguide ring 14 to limit attenuation of the light 100 in the ring resonator 16 and optical waveguides 16 due to the presence of the wiring 40. As shown in FIG. 2B, an opening 42 can be etched down through the second layer 38 and filled with a deposited metal via 44 (e.g. comprising tungsten) to connect the wiring 40 to each connecting member 22.

Directly heating the optical waveguide ring 14 using the integral heater 34 is advantageous to minimize any thermal spreading and also to minimize the electrical power and time required for changing the effective refractive index in the ring resonator 14 via the thermo-optic effect. Computational simulations of the device 10 of FIGS. 2A and 2B indicate that several teraHertz (THz) of tuning of the resonant frequency is possible on a time scale of less than 1 μs with a power consumption of about 5 microWatts (μW) per gigaHertz (GHz) of frequency tuning, and an overall power consumption on the order of 10 milliWatts (mW) or less. A further advantage of directly heating the optical ring waveguide 14 using a heater 34 formed therein is that higher-order resonator devices 10 based on the thermo-optic effect can be formed with two or more optical waveguide rings 14 located adjacent to each other. With the thermal spreading being minimized by locating the electrical heater 34 directly within the optical waveguide ring 14, the temperature in each ring resonator 14 can be independently controlled for optimum performance. The minimal thermal spreading achieved by locating the electrical heater 34 directly within the optical waveguide ring 14 also reduces a thermal cross-talk between adjacent optical waveguide devices 10 when such devices 10 are formed on a common substrate 12.

Figure 3A:
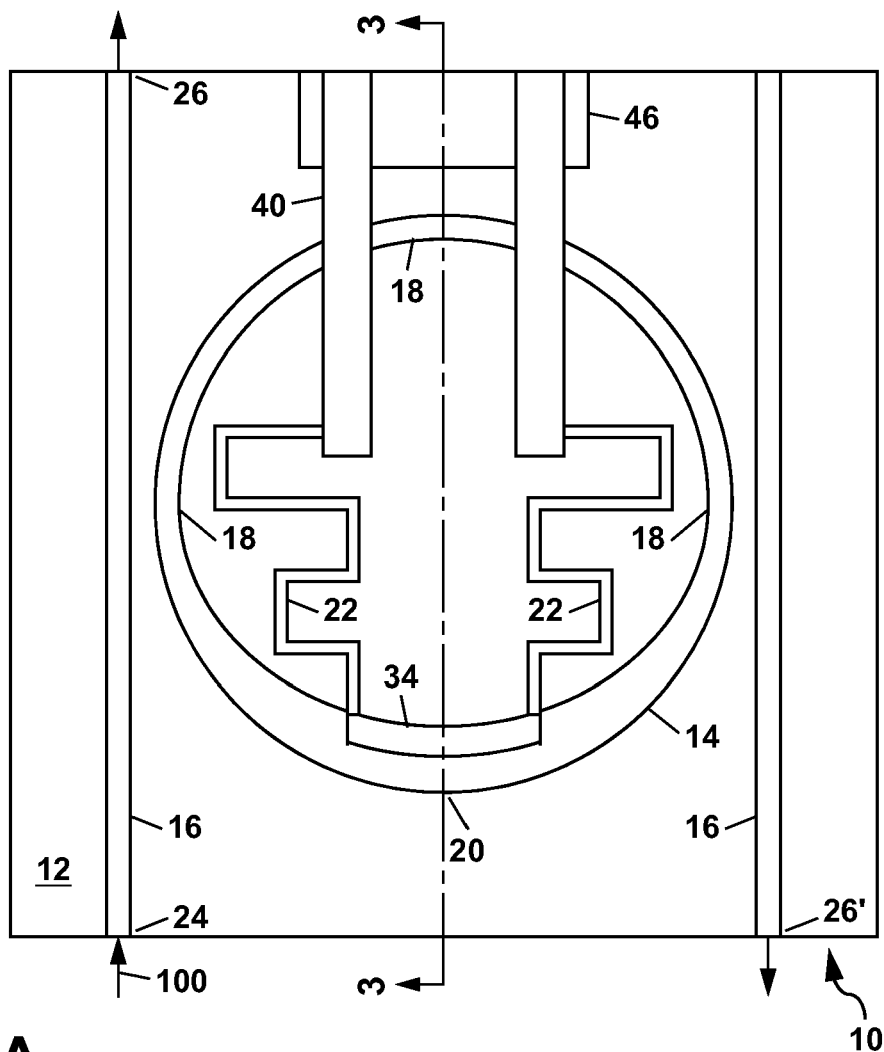
FIG. 3A shows a schematic plan view of a third example of an optical waveguide apparatus according to the present invention.
Figure 3B:
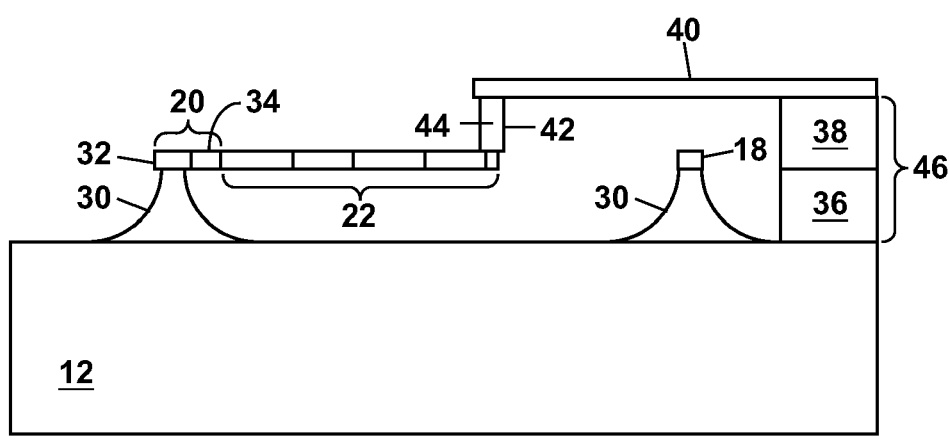
FIG. 3B shows a schematic cross-section view of the device of FIG. 3A along the section line 3-3 in FIG. 3A.

In other embodiments of the present invention, the layers 36 and 38 can be removed except for a pedestal 30 located directly beneath the optical waveguide ring 14 and the optical waveguides 16 and a support 46 for the wiring 40. This can be done in a manner similar to that described previously with reference to FIGS. 1A and 1B by using a selective wet etchant to etch away the layers 36 and 38 except for the pedestals 30 and the support 46. This is schematically illustrated in FIGS. 3A and 3B, which shows a third example of the present invention where the wiring 40 is formed as an air bridge with one end of the wiring 40 being attached to the support 46 and another end of the wiring 40 being supported by the vias 44 and connecting members 22. The wiring 40 can be, for example, 0.5 μm wide.

The examples of FIGS. 2A, 2B and 3A, 3B can be used, for example, to form a wavelength-selective optical filter, modulator, or switch. Light 100 having one or more frequencies can be directed into one of the optical waveguides 16 as shown in FIGS. 2A and 3A; and a specific frequency of the light 100 will be coupled into the optical waveguide ring 14 when that frequency corresponds to the resonant frequency of the optical resonator formed by the optical waveguide ring 14. The resonant frequency can be varied in the ring resonator 14 using the thermo-optic effect by locally heating the optical waveguide ring 14 using the electrical heater 34. The resonant frequency will be filtered or switched out of the input light 100 will not appear at the exit port 26 of this waveguide 16 which is termed a thru port. Instead, the resonant frequency of the light 100 will be coupled through the ring 14 to a second waveguide 16 and will appear at the exit port 26' of this waveguide 16 which forms a drop port for the device 10. If the heating produced by the electrical heater 34 is switched on an off, the optical ring resonator devices 10 of FIGS. 2A, 2B and 3A, 3B can form an optical switch to switch a particular frequency of the light 100 on and off between the thru port 26 and the drop port 26'. And, by modulating the heating produced by the electrical heater 34, light 100 at the ports 26 and 26' can be modulated.

Although the examples of FIGS. 2 and 3 show a single heater 34, in other embodiments of the present invention, multiple heaters 34 can be provided in the optical waveguide ring 14. This can be done, for example, by providing two regions of maximum width 20 of the optical waveguide ring 14 (see FIGS. 4A and 6A) and then locating an electrical heater 34 proximate to each region of the maximum width 20 of the optical waveguide ring 14. The two electrical heaters 34 can be electrically connected in series or in parallel. As another example, the impurity-doped region can extend around the entire circumference of the optical waveguide ring 14 to form the electrical heater 36. This can be done, for example, during epitaxial growth, or via ion implantation or thermal diffusion. In this case, the voltage to the heater 36 can be applied through connecting members 22 located on opposite sides of the ring 14 where the maximum width 20 can be provided.

Figure 4A:
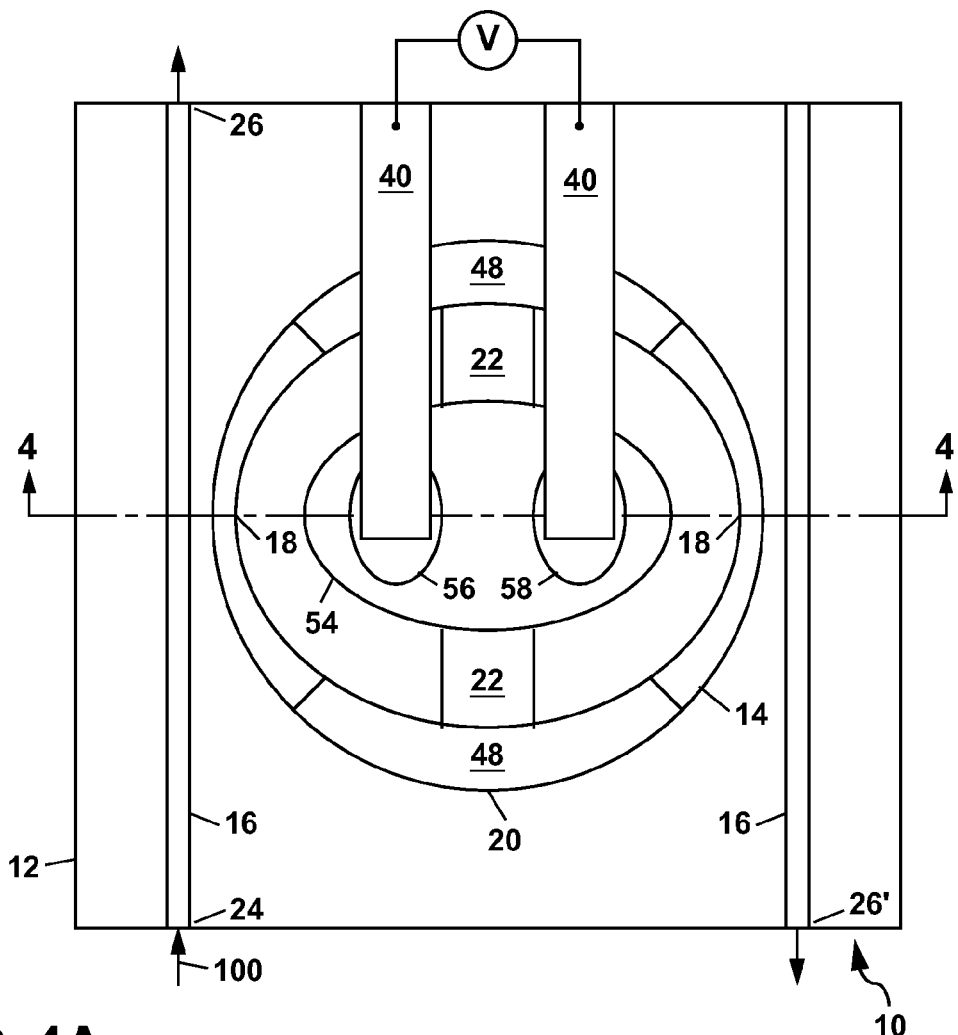
FIG. 4A shows a schematic plan view of a fourth example of an optical waveguide apparatus according to the present invention.
Figure 4B:
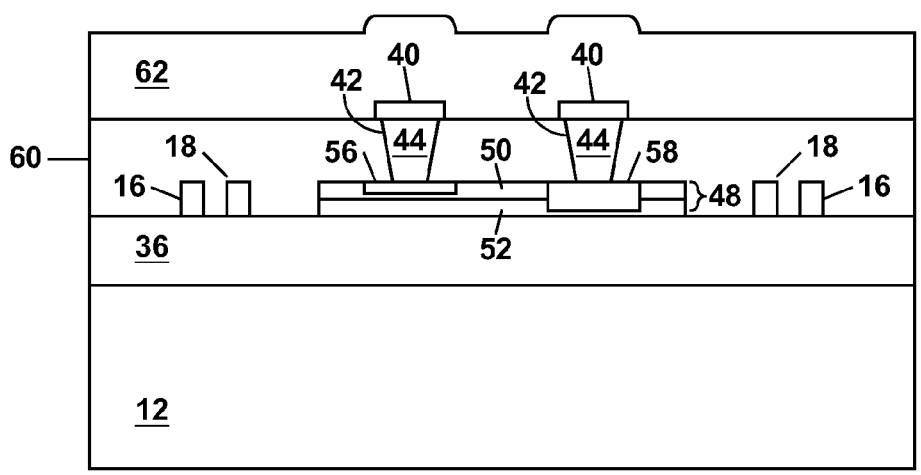
FIG. 4B shows a schematic cross-section view of the device of FIG. 4A along the section line 4-4 in FIG. 4A.

FIGS. 4A and 4B schematically illustrate a fourth example of an optical waveguide apparatus 10 according to the present invention. In this example of the present invention, a vertical semiconductor junction 48 is formed in the device 10 to allow a resonant frequency therein to be varied. The resonant frequency can be varied by changing an effective index of refraction within a portion of an optical ring resonator 14 due to carriers (i.e. electrons and holes) which can be injected or depleted by a bias voltage applied to the vertical semiconductor junction 48.

In the example of FIGS. 4A and 4B, the vertical semiconductor junction 48 comprises two vertically-stacked (i.e. superposed) regions of opposite doping types including a p-type-doped region 50 and an n-type-doped region 52. The two regions 50 and 52 can be formed, for example, by ion implantation of an impurity dopant into a monocrystalline silicon layer of an SOI substrate. The monocrystalline silicon layer can be, for example, about 0.26 μm thick and can be located above a silicon oxide layer 36 about 1 μm thick. A monocrystalline silicon body of the SOI substrate can form the substrate 12 for the device 10 of FIGS. 4A and 4B.

The vertical semiconductor junction 48 can be made by implanting boron (B) ions to form the p-type-doped region 50 with a peak boron ion concentration of about $10^{18}$ $cm^{-3}$, and by implanting arsenic (As) ions to form the n-type-doped region 52 with about the same peak ion concentration. The ion energy used for implanting the B and As ions can be selected so that the p-type-doped region 50 will be formed on one side of the vertical semiconductor junction (e.g. a top side thereof as shown in FIG. 4B) and so that the n-type-doped region is formed on the other side of the vertical semiconductor junction (e.g. on a bottom side thereof as shown in FIG. 4B). As an example, the B ions can be implanted at an energy of about 110 keV; and the As ions can be implanted at an energy of about 380 keV.

The implanted B ions will generally have a tail of lower ion concentration which extends into the n-type-doped region 52, and the implanted As ions will have a tail of lower ion concentration which extends into the p-type-doped region 50. An area of overlap of the lower-ion-concentration n-type and p-type tails can also form an intrinsic (i) region of the vertical semiconductor junction 48 between the p-type-doped region 50 and the n-type-doped region 52. Thus, depending upon an ion implant profile for the p-type and n-type doping, either a semiconductor p-n junction or a semiconductor p-i-n junction can be formed in the device 10 of FIGS. 4A and 4B.

In other embodiments of the present invention, the vertical semiconductor junction 48 can be formed by thermal diffusion or by doping during epitaxial growth. As an example, an SOI substrate can be procured with a monocrystalline silicon layer of a first doping type (e.g. n-type doped), and an impurity dopant of the opposite doping type (e.g. p-type) can be thermally diffused into the monocrystalline silicon layer to form the vertical semiconductor junction 48. As another example, a SOI substrate can be procured with a monocrystalline silicon layer of the first doping type, and another monocrystalline silicon layer of the opposite doping type can be epitaxially grown upon the monocrystalline silicon layer to form the vertical semiconductor junction 48.

In the example of FIGS. 4A and 4B, the vertical semiconductor junction 48 can be formed in a portion of the optical waveguide ring 14 which is located proximate to the maximum value 20 of the width of the ring 14. This can be done, for example, by forming the vertical semiconductor junction 48 in a quadrant of the optical waveguide ring 14 centered about the maximum value 20 of the width of the ring 14 as shown in FIG. 4A. The vertical semiconductor junction 48 can also be formed in each connecting member 22 and in a contact region 54 located inside the ring 14 and connected to the ring 14 by the connecting members 22. Forming the vertical semiconductor junction 48 throughout the connecting members 22 and contact region 54 is useful for electrically contacting the vertical semiconductor junction 48 although this can increase a leakage current in the junction 48. In other embodiments of the present invention, the extent of the vertical semiconductor junction 48 in the connecting members 22 and contact region 54 can be reduced to reduce the leakage current.

In the contact region 54, additional ion implantation steps can be used to form a p-type-doped plug 56 and an n-type-doped plug 58. These plugs 56 and 58, which have a much higher impurity doping level of about $10^{21}$ cm$^{-3}$, are used for electrically contacting each side of the vertical semiconductor junction 48. The p-type-doped plug 56, which can comprise B ions, can be implanted at an ion energy of about 35 keV and extends down into the p-type-doped region 50 to form a low-resistance contact with this region. The n-type-doped plug 58, which can comprise phosphorous (P) ions, can be implanted at an ion energy of about 40 keV and extends down into the n-type-doped region 52 to contact this region. After the ion implantation steps, a thermal annealing step at an elevated temperature of about 900° C. can be used to activate the implanted ions.

A passivation layer 60 formed of a low-thermal-conductivity material can then be blanket deposited over the substrate 12 and chemically-mechanically polished back to a layer thickness of about 0.9 μm. This passivation layer 60, which can comprise TEOS deposited by a plasma-enhanced CVD (PECVD) process, encapsulates the optical waveguides 16 and optical waveguide ring 14 to form a low-refractive-index cladding about these elements, and also passivates the vertical semiconductor junction 48.

Openings 42 can then be reactive ion etched through the passivation layer 60 at the locations of the plugs 56 and 58 in preparation for depositing metal vias 44 (e.g. comprising tungsten) to connect the vertical semiconductor junction 48 to wiring 40 which will be formed on the passivation layer 60. In some cases, the p-type-doped plug 56 and n-type-doped plug 58 can be formed by implanting ions through the openings 42 in the passivation layer 60. After the openings 42 in the passivation layer 60 are formed, an exposed surface of the monocrystalline silicon layer in each opening can be silicided using sputter deposited layers of titanium and titanium nitride followed by a rapid thermal annealing step to convert these deposited layers into titanium silicide. The metal vias 44 (e.g. comprising tungsten) can then be deposited to overfill the openings 42, and then a chemical-mechanical polishing step can be used to planarize the metal back to or slightly below the level of the passivation layer 60. The wiring 40 and contact pads (not shown), which can comprise aluminum or an aluminum alloy (e.g. Al—Cu) can then be blanket deposited over the surface of the passivation layer 60 and patterned by etching using a photolithographically-defined etch mask.

Another passivation layer 62 can be deposited by PECVD to cover the wiring 40 and passivate the device 10. This passivation layer 62 can comprise, for example, about 1 μm of a phosphorous glass which can be blanket deposited over the substrate 12. The passivation layer 62 does not need to be planarized after deposition. Openings can be etched through this passivation layer 62 to open up the contact pads (not shown) for making external electrical connections to the wiring 40.

The dimensions of the device 10 of FIGS. 4A and 4B can be similar to the other examples of the present invention herein. The radius of the optical waveguide ring 14 can be, for example, 2-5 μm with a thickness of, for example, 0.25-0.26 μm when the optical waveguide ring 14 and optical waveguides 16 are fabricated from the monocrystalline silicon layer of an SOI substrate. In this case, the minimum width 18 of the ring 14 can be 0.55 μm, and the maximum width 20 can be 1.05 μm. A spacing between each optical waveguide 16 and the optical waveguide ring 14 for an evanescent coupling of the light 100 therebetween can be 0.15-0.35 μm. Each connecting member 22 can be 0.5 μm wide; and the contact region 54 can be elliptical with dimensions 1 μm×2 μm. Each optical waveguide 16 can have a width of 0.4-0.45 μm.

The optical waveguide device 10 of FIGS. 4A and 4B can be operated with a bias voltage V connected to the wiring 40 and applied across the vertical semiconductor junction 48. This voltage V can be used to vary the resonant frequency of the optical ring resonator 14 and thereby control the coupling of the light 100 between each optical waveguide 16 and the ring resonator 14. The bias voltage V can be either a reverse-bias voltage which depletes carriers from the portion of the ring resonator 14 occupied by the vertical semiconductor junction 48, or a forward-bias voltage which injects carriers into the ring resonator 14 via the vertical semiconductor junction 48.

Reverse-biasing of the ring resonator 14 with a reverse-bias voltage V can change the resonant frequency therein as carriers are depleted from a depletion width about the vertical semiconductor junction 48. For an n-type and p-type dopant density of about $8 \times 10^{17}$ cm$^{-3}$ in the vertical semiconductor junction 48, device simulations with a three-dimensional (3D) finite element model of the optical ring resonator device of FIGS. 4A and 4B predict that the depletion width will be 0.06 μm for an applied reverse-bias voltage of V=0 Volts, and will increase to 0.12 μm when the reverse-bias voltage V is −2.4 Volts, and will further increase to 0.15 μm when the reverse-bias voltage V is −5 Volts. This depletion of carriers due to the applied reverse-bias voltage V increases an effective index of refraction in the ring resonator 14 which, in turn, increases the wavelength of the light 100 which is coupled into the ring resonator 14.

Forward-biasing of the ring resonator 14 has the opposite effect of injecting carriers which decreases the effective index of refraction in the ring resonator 14 and thereby decreases the wavelength of the light 100 coupled into the ring resonator 14. The variation in the resonant frequency of the optical ring resonator devices 10 described herein can be on the order of 10 GHz for a reverse bias voltage V of −5 Volts applied to the vertical semiconductor junction 48, and can on the order of 100 GHz for a forward bias voltage V of +1 Volt applied to the vertical semiconductor junction 48. The exact variation of the resonant frequency will depend upon a number of factors including the size of the resonator, whether the resonator is formed as a ring or as a disk, and the proportion of the resonator occupied by the vertical semiconductor junction 48.

Figure 5A:
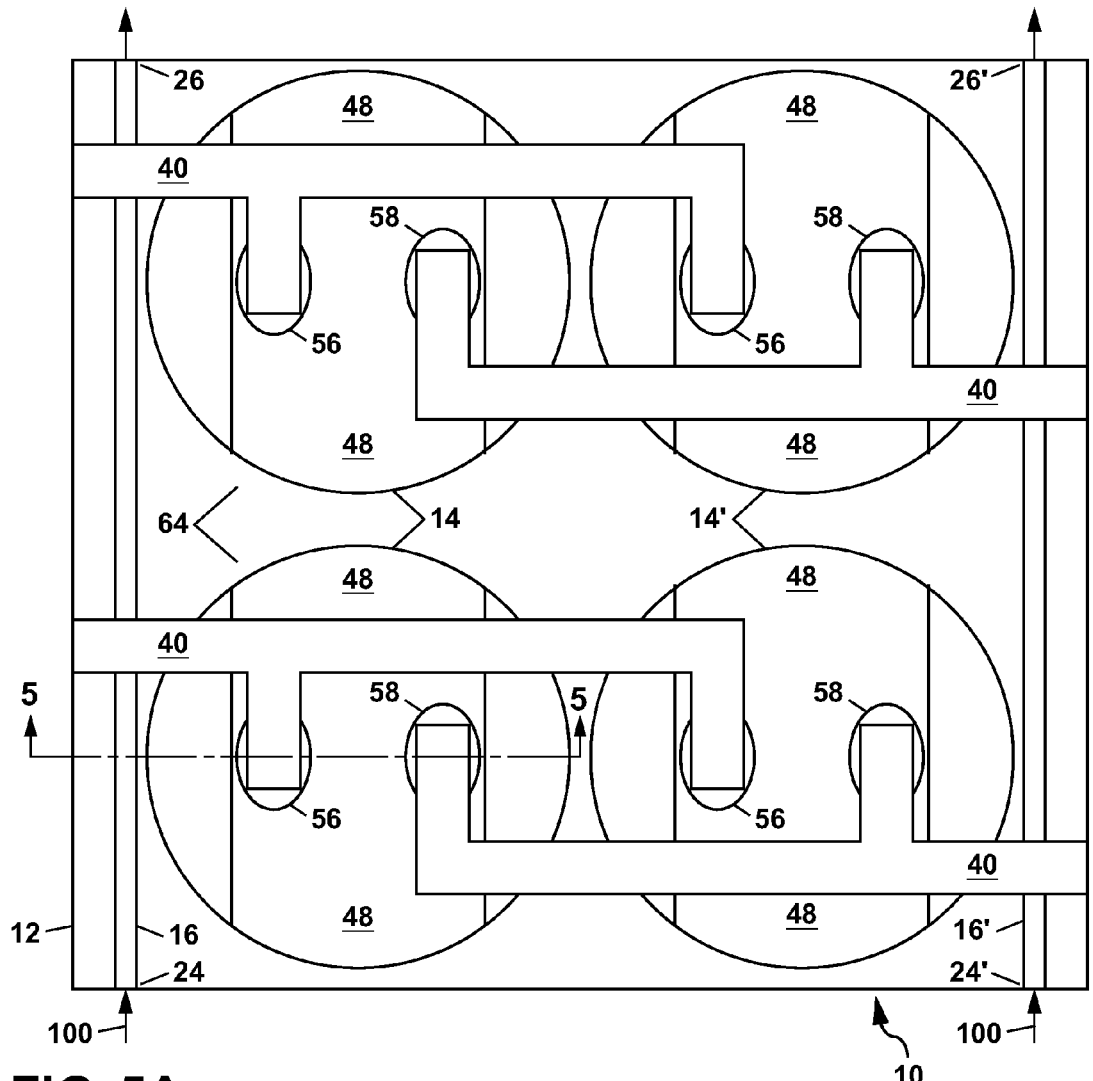
FIG. 5A shows a schematic plan view of a fifth example of an optical waveguide apparatus according to the present invention.
Figure 5B:
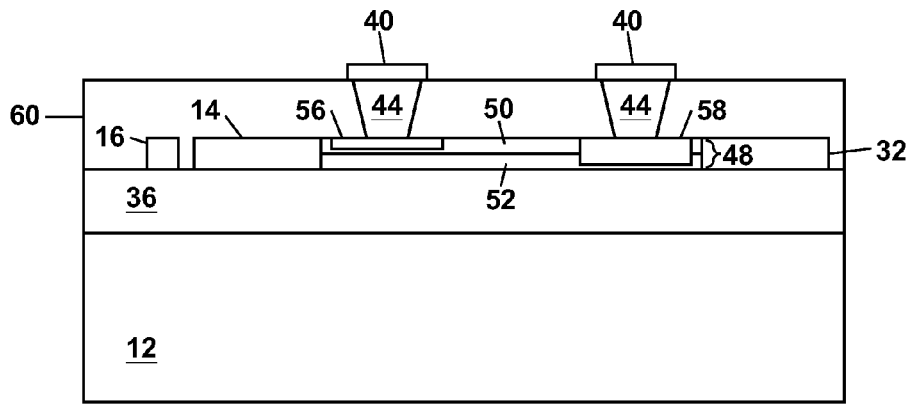
FIG. 5B shows a schematic cross-section view of the device of FIG. 5A along the section line 5-5 in FIG. 5A.

The vertical semiconductor junction 48 can also be used in an optical waveguide device 10 having a disk shape. With a disk shape for the device 10, optical waveguiding occurs through "whispering gallery" modes which reflect off the a hard curved outer sidewall 32 of the disk-shaped ring resonator. This is shown in a fifth example of the present invention in FIGS. 5A and 5B which can be used as a wavelength-selective second-order filter, modulator or switch which provides a narrower pass-band for filtering, modulation or switching than can be achieved using only a single resonator 14 as in the optical waveguide devices 10 of FIGS. 2-4. FIG. 5A shows a schematic plan view of this device 10 which can include one or more pairs of optical ring resonators 14 and 14' with each pair of the optical ring resonators forming a separate channel 64 for filtering, modulation or switching. FIG. 5B shows a schematic cross-section view taken along the section line 5-5 in FIG. 5A for one of the optical ring resonators 14 and adjacent optical waveguides 16 and 16' to show the construction of this optical waveguide device 10 of the present invention.

Although not shown, an electrical heater 36 and a temperature sensor can be optionally added to the device 10 of FIGS. 5A and 5B or to the other devices 10 described herein, with the heater 36 and temperature sensor being connected to additional wiring 40. In the example of FIGS. 5A and 5B, the heater 36 can be formed in an interior portion of the optical ring resonators 14 and 14' in a space not occupied by the vertical semiconductor junction 48. Such a heater 36 is useful to tune the resonant frequency of the rings 14 and 14' to be substantially the same, or to stabilize the temperature of the rings 14 and 14', or both. The temperature sensor is useful to readout the temperature of each ring 14 and 14', and also for use in temperature stabilizing the rings 14 and 14'. The temperature sensor can comprise, for example, a semiconductor junction or a resistor which is formed by ion implantation.

In the example of FIGS. 5A and 5B, the optical waveguide apparatus 10 is a multi-channel device which comprises a plurality of channels 64, with each channel 64 further comprising two optical ring resonators 14 and 14' located side-by-side between a pair of optical waveguides 16 and 16'. The optical waveguide 16 includes an input port 24 and an output port 26; and the optical waveguide 16' includes an input port 24' and an output port 26'. This arrangement provides for four-port switching, filtering or modulation. Light 100 entering one or more of the input ports 24 and 24' can be filtered, modulated or switched by the channels 64 to emerge from one or more of the output ports 26' and 26. This switching, filtering or modulation will occur for each frequency of the light 100 which is resonant with the optical ring resonators 14 and 14' in a particular channel 64. The resonant frequency of the ring resonators 14 and 14' in each channel 64 can also be independently tuned, as needed, to select the frequency of the light 100 to be switched, filtered or modulated by that channel 64. In this fifth example of the present invention, the optical ring resonators 14 and 14' can be formed as disks (also termed microdisks), or alternately can be formed with an adiabatically varying waveguide width as shown in the example of FIGS. 4A and 4B.

In the microdisk optical ring resonators 14 and 14' in FIGS. 5A and 5B, a vertical semiconductor junction 48 can be provided which covers a portion or the entirety of each disk-shaped optical ring resonator 14 and 14'. The vertical semiconductor junction 48 can have an arbitrary shape. Although the microdisk optical ring resonators 14 and 14' in FIG. 5A are shown as being circular, those skilled in the art will understand that other shapes for the microdisk optical ring resonators 14 and 14' can be used including polygonal, elliptical and oval shapes.

The device 10 of FIGS. 5A and 5B can be fabricated as previously described, with each optical ring resonator 14 and 14' in a particular channel 64 being formed substantially identically to provide substantially the same resonant frequency therein. When the pair of optical ring resonators 14 and 14' for each channel 64 are fabricated from monocrystalline silicon (e.g. using an SOI substrate) for operation at a wavelength near 1.5 μm, the ring resonators 14 and 14' in each channel 64 can be spaced apart by 0.35-0.5 μm, for example. In this case, each resonator 14 or 14' can be spaced apart from an adjacent optical waveguide 16 or 16' by a distance of 0.2-0.25 μm. The dimensions of the optical waveguides 16 and 16' and the thickness of the optical ring resonators 14 and 14' can be as previously described with reference to FIGS. 4A and 4B.

By locating the electrical contacts comprising a p-type-doped plug 56 and an n-type-doped plug 58 and vias 44 within each optical ring resonator 14 and 14' as shown in FIGS. 5A and 5B and the other examples of the present invention described herein, a hard curved outer sidewall 32 can be provided for each optical ring resonator 14 and 14' by completely etching down vertically through the material used to form the optical ring resonators 14 and 14' without forming any steps in the sidewall 32. This provides a much tighter mode confinement of the light 100 in the ring resonators 14 and 14' than if that material (i.e. monocrystalline silicon or silicon nitride) were to be etched only partway through to form a stepped sidewall. The tighter mode confinement allows the use of a smaller radius for the optical ring resonators 14 and 14' which can be made as small as 2-5 μm when monocrystalline silicon is used for the ring resonators 14 and 14'. This can substantially reduce the size of the various examples of optical ring resonator devices 10 of the present invention while, at the same time, substantially increasing a free-spectral range (FSR) for the devices 10 and also reducing the electrical power required to operate the devices 10. As a result, a larger number of devices 10 can be located on a common substrate 12. This is particularly important for wide-band chip-to-chip and intrachip communication applications which may require a relatively large number of devices 10 to be arrayed on a common substrate 12 as an M×N optical crossbar switch where M is the number of optical inputs to the waveguides 16 and N is the number of channels 64.

In the example of FIGS. 5A and 5B, each channel 64 can act as an independent filter or switch with a second-order pass-band which can be on the order of 40 GHz full-width at half maximum (FWHM) when the radius of the optical ring resonators 14 and 14' is 3 µm. For these ring resonators 14 and 14', the free-spectral range (FSR) is 4.2 THz (32.5 nm) which can allow forty channels 64 to be provided in the optical waveguide apparatus 10 of FIGS. 5A and 5B as a one-dimensional (1-D) array, with adjacent channels 64 being spaced 100 GHz apart. A switching time for the optical ring resonators 14 and 14' in each channel 64 can be on the order of a few nanoseconds or less when carrier depletion or injection is used. To filter or switch the light 100 through a particular channel 64 the resonant frequency of the optical ring resonators 14 and 14' in that channel 64 can be tuned near the center of the 40 GHz second-order pass-band for that channel 64. To block the transmission of light 100 through a particular channel 64, the resonant frequency of the optical resonators 14 and 14' for that channel 64 can be tuned outside the pass-band for that channel 64 (e.g. to a frequency which is about half-way between adjacent channels 64).

The device 10 of FIGS. 5A and 5B can also be used as a wavelength-selective optical modulator. In this mode of operation, the bias voltage applied to the pair of optical ring resonators 14 and 14' can be amplitude modulated to vary the resonant frequency about the second-order pass-band for a particular channel 64 and thereby modulate the light 100 which is transmitted through that channel 64 between the pair of optical waveguides 16 and 16'.

The device 10 of FIGS. 5A and 5B can be formed with an arbitrary number of optical waveguides 16 with a plurality of optical ring resonators 14 located between each adjacent pair of the optical waveguides 16 to form a two-dimensional (2-D) array optical waveguide apparatus 10 to allow switching of light 100 between the various optical waveguides 16. This will allow light 100 which is input to any of the optical waveguides 16 to be coupled into any other optical waveguide 16 of the device 10.

Since the device 10 of FIGS. 5A and 5B and the other devices 10 described herein can be fabricated using conventional silicon integrated circuit (IC) fabrication technology (e.g. CMOS technology), this will allow the various examples of the optical waveguide devices 10 described herein to be integrated with electronic circuitry on the same substrate 12. This is useful to provide a multi-channel capability for optical filtering, modulation, switching or phase shifting. Additionally, each optical waveguide device 10 can also be used as a photodetector to detect the light 100 coupled therein when that device 10 includes a semiconductor junction.

In the examples of FIGS. 4A, 4B and 5A, 5B, each optical waveguide device 10 can function as a photodetector when the vertical semiconductor junction 48 is reverse-biased. This can be done using a direct-current (dc) bias voltage. Reverse-biasing the vertical semiconductor junction 48 extracts carriers which are generated by absorption of a portion of the light 100 in the vertical semiconductor junction 48 to produce an electrical output signal which is coupled to the wiring 40. The electrical output signal, which can be amplitude modulated, can be coupled out of the wiring 40, for example, by using a coupling capacitor. The magnitude of the bias voltage can be adjusted to tune the resonant frequency of the optical ring resonator 14 to select a particular frequency of the light 100 for detection.

Those skilled in the art will understand that higher-order optical waveguide devices 10 can be formed by inserting additional optical ring resonators 14 between the pair of ring resonators 14 and 14' in each channel 64 of the second-order device 10 shown in FIGS. 5A and 5B. As an example, to form a fourth-order device 10, two additional optical ring resonators 14 can be located between the pair of optical ring resonators 14 and 14' of each channel 64 in FIG. 5A, with these additional ring resonators 14 being electrically connected to the wiring 40 in the same way as the pair of ring resonators 14 and 14' in FIG. 5A.

Figure 6A:
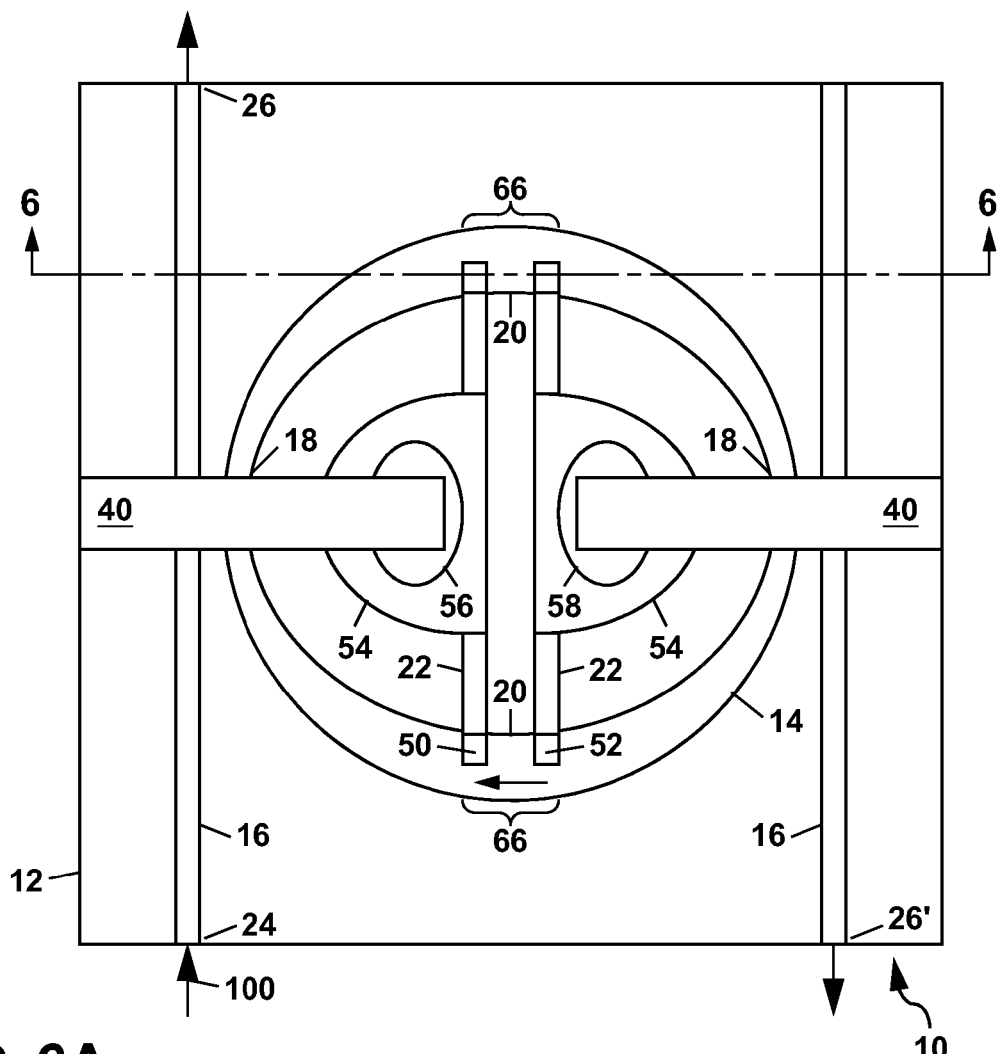
FIG. 6A shows a schematic plan view of a sixth example of an optical waveguide apparatus according to the present invention.
Figure 6B:
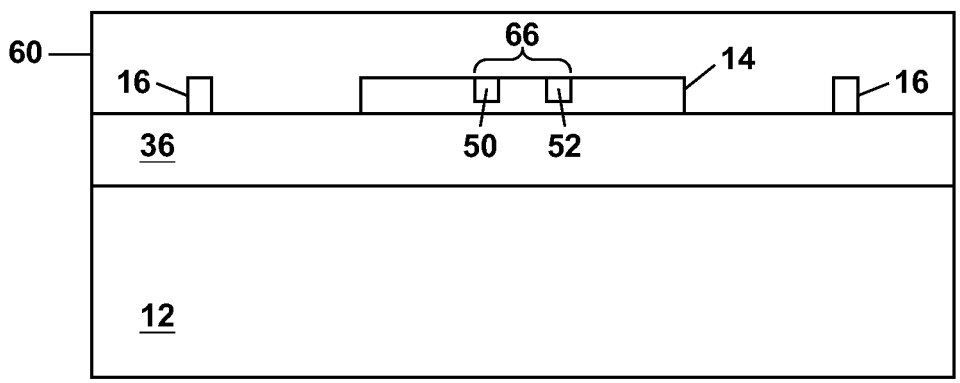
FIG. 6B shows a schematic cross-section view of the device of FIG. 6A along the section line 6-6 in FIG. 6A.

FIGS. 6A and 6B schematically illustrate in plan view and in cross-section view, respectively, a sixth example of the optical waveguide apparatus 10 of the present invention. In this example, a horizontal semiconductor junction 66 is located within the optical waveguide ring 14 at a location near the maximum width 20 of the ring 14. The horizontal semiconductor junction 66 comprises a p-type-doped region 50 and an n-type-doped region 52 which are arranged circumferentially around the ring resonator 14 as shown in FIGS. 6A and 6B. The two regions 50 and 52 can be formed, for example, by ion implantation using boron (B) as the p-type dopant and arsenic (As) or phosphorous (P) as the n-type dopant. The p-type-doped region 50 and n-type-doped region 52 can extend at least partway across the width of the optical ring resonator 14, and at least partway down into the resonator 14 from an upper surface thereof. The horizontal semiconductor junction 66 can be either a p-n or p-i-n junction depending upon a spacing between the two regions 50 and 52. Locating the p-type-doped region 50 and the n-type-doped region 52 side-by-side in a circumferential direction around the ring resonator 14 as indicated by the arrow in FIG. 6A allows the regions 50 and 52 to be electrically contacted from inside the ring resonator 14 using electrical contacts formed by the connecting members 22, the contact regions 54 and the plugs 56 and 58. Electrically contacting the regions 50 and 52 from within the optical ring resonator 14 as shown in FIG. 6A saves space, and minimizes any perturbation to the mode of the light 100 circulating around the ring resonator 14.

Fabrication of the optical waveguide device 10 of FIGS. 6A and 6B can be performed in substantially the same manner as has been described with reference to FIGS. 4A and 4B using an SOI substrate having a monocrystalline silicon layer about 0.26 µm thick. The optical waveguides 16 and the optical ring resonator 14 including the contact region 54 and the connecting members 22 can all be formed from the monocrystalline silicon layer. The ion implant energy for the p-type-doped region 50 and the n-type-doped region 52 can be selected so that these two regions 50 and 52 extend downward through the monocrystalline silicon layer to about the same depth. Two separate contact regions 54 can be used as shown in FIG. 6A with each contact region 54 being oppositely doped. Each connecting member 22 can also be doped with the same p-type or n-type doping as the contact region 54 to which it is connected. Each contact region 54 can also include a p-type-doped plug 56 or an n-type-doped plug 58 to provide a low-resistance electrical connection between the contact region 54 and a metal via 44 which extends upward through the passivation layer 60 to wiring 40.

Figure 7A:
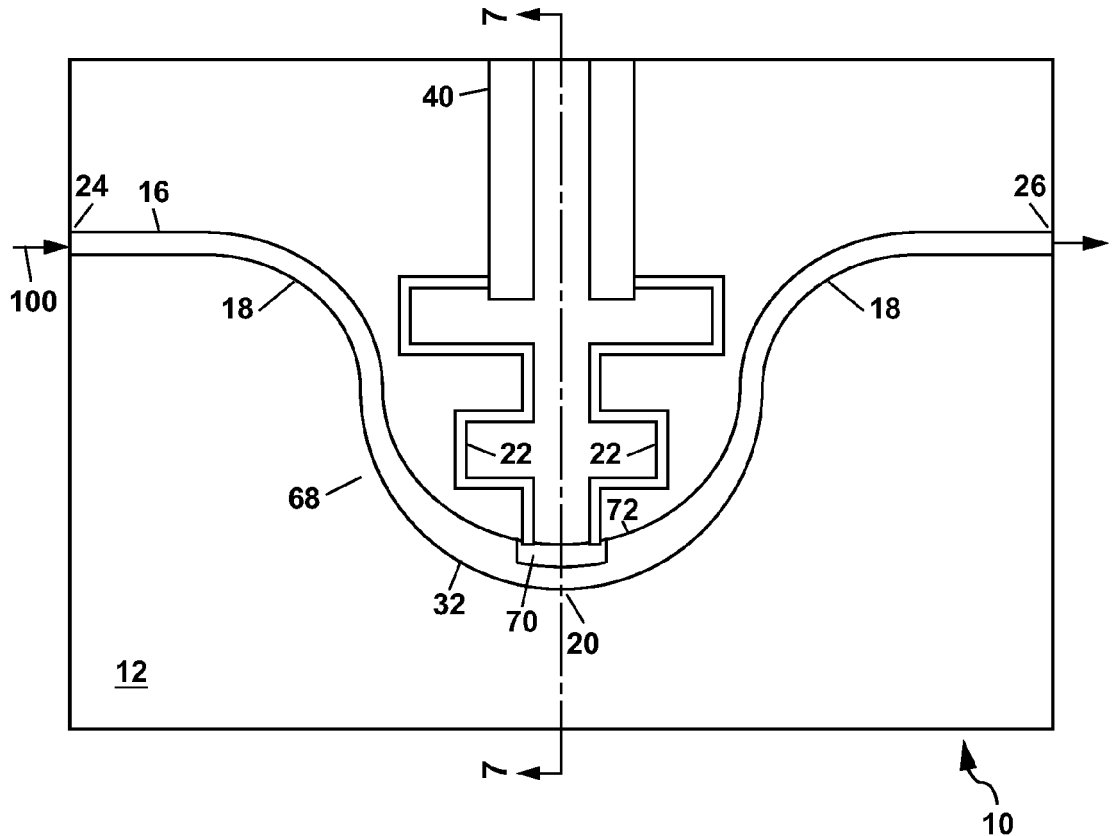
FIG. 7A shows a schematic plan view of a seventh example of an optical waveguide apparatus according to the present invention.
Figure 7B:
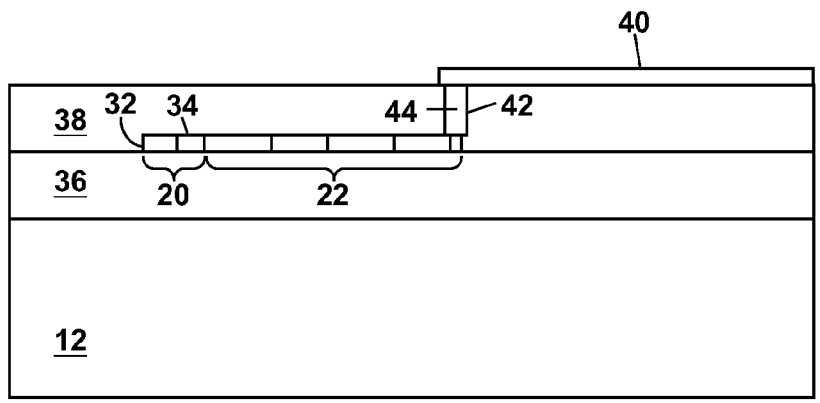
FIG. 7B shows a schematic cross-section view of the device of FIG. 7A along the section line 7-7 in FIG. 7A.

FIGS. 7A and 7B show schematic plan and cross-section views, respectively, of a seventh example of the optical waveguide apparatus 10 of the present invention. The apparatus 10 in FIGS. 7A and 7B has applications for forming optical phase shifters, time delays, interferometers, modulators and switches.

The apparatus 10 of FIGS. 7A and 7B comprises an optical waveguide 16 having an input port 24 where light 100 can be directed into the device 10 and an exit port 26 where the light 100 exits the device 10 as indicated by the horizontal arrows in FIG. 7A. The optical waveguide 16 further includes a waveguide bend 68 with a width that varies adiabatically with distance along at least a portion of the waveguide bend 68 between a minimum value 18 of the width and a maximum value 20 thereof. The maximum value 20 of the width can be located, for example, near a midpoint of the waveguide bend 68 as shown in FIG. 7A, with the midpoint being intersected by the section line 7-7. In some embodiments of the present invention, the waveguide bend 68 can be undulating with a plurality of maximum values 20 and minimum values 18 of the width. The term "waveguide bend" as used herein refers to an optical waveguide having an open-loop optical path with at least one curve therein.

In the example of FIGS. 7A and 7B, the connecting members 22 are used to supply electrical power to an impurity-doped region 70 which is provided within the waveguide bend 68 proximate to the maximum value 20 of the width and also proximate to an inner sidewall 72 of the waveguide bend 68. The impurity-doped region 70 can be doped with a single impurity dopant, which can be either n-type or p-type, to form an electrical heater 34 as described previously with reference to FIGS. 2A and 2B. In other embodiments of the present invention, the impurity-doped region 70 of the optical waveguide device 10 can be doped to form with a p-type-doped region 50 and an n-type-doped region 52 to form either a vertical semiconductor junction 48 as previously described with reference to FIGS. 4A and 4B, or to form a horizontal semiconductor junction 66 as previously described with reference to FIGS. 6A and 6B.

In other embodiments of the present invention, one or more connecting members 22 can be attached to the waveguide proximate to the midpoint of the waveguide bend 68 and used to mechanically suspend the waveguide bend 68 above the substrate 12 in a manner similar to that previously described with reference to FIGS. 1A and 1B. This can be useful to provide an increased mechanical and thermal isolation from the substrate 12 since the connecting members 22 can be made small and are attached to the waveguide bend 68 at a location where a minimal perturbation of the optical field of the light 100 will occur since the optical field of the light 100, although expanded, is located well away from an inner sidewall 72 of the waveguide bend 68.

In yet other embodiments of the present invention, the connecting members 22 can be used to both suspend and move the waveguide bend 68. This can be done, for example, by providing an actuator on the substrate 12, with the actuator being connected through one or more connecting members 22 to push against or pull on the waveguide bend 68 at a location proximate to the maximum width 20 of the waveguide bend 68. The actuator can be, for example, a microelectromechanical (MEM) electrostatic actuator or a MEM thermal actuator. MEM electrostatic and thermal actuators are well-known in the art. When another optical waveguide 16' is located proximate to the waveguide bend 68, the actuator can move the suspended waveguide bend 68 laterally by a fraction of a micron or more, thereby controlling an evanescent coupling of light 100 being guided through the waveguide bend 68 so that a portion of the light 100 can be coupled into the adjacent optical waveguide 16'. Such a device 10 can be used, for example, as an optical switch to control the coupling of the light 100 between the waveguide bend 68 and the adjacent optical waveguide 16'.

Returning to the example of FIGS. 7A and 7B, light 100 can be coupled into the optical waveguide 16 at the input port 24 of the device 10 and is transmitted to the output port 26 thereof. As the light 100 travels through the optical waveguide 16, the light 100 is in a guided mode (e.g. a fundamental mode) for portions of the optical waveguide 16 and the waveguide bend 68 where the width is at the minimum value 18, and is in a "whispering gallery" mode characterized by multiple reflections of the light 100 off of an outer sidewall 32 of the waveguide bend 68 in a portion of the waveguide bend 68 where the width increases between the minimum value 18 and the maximum value 20. In this way, the light 100 is reflected past the impurity-doped region 70 with the optical field of the light 100 being located well away from an inner sidewall 72 of the waveguide bend 68 so that there is a minimal loss in the transmission of the light 100 produced by the presence of the impurity-doped region 70.

The impurity-doped region 70, however, can change the effective index of refraction in the waveguide bend 68 either via the thermo-optic effect as previously described herein with reference to FIGS. 2A and 2B, or by injecting or depleting carriers (i.e. electrons and holes) in the waveguide bend 68 as previously described with reference to FIGS. 4A and 4B. In either case, the change in the effective index of refraction Δn can be produced using a voltage applied to the impurity-doped region 70 using a pair of connecting members 22 which form electrical contacts to the impurity-doped region 70, with the connecting members 22 being connected to wiring 40 supported above the substrate 12 on which the optical waveguide 16 is located. The change in the effective index of refraction Δn in the waveguide bend 68 changes an optical path length for the light 100 traveling through the optical waveguide 16; and this results in a phase shift ΔΦ of the light 100 which can be expressed as:

$$\Delta\phi = \frac{2\pi}{\lambda}\Delta nL$$

where λ is the wavelength of the light 100, and L is a portion of the optical waveguide 16 wherein the effective index of refraction Δn is changed by either the thermo-optic effect, or by the injection or depletion of carriers.

When the impurity-doped region 70 forms an electrical heater, the change in the effective refractive index Δn can be directly related to the thermo-optic coefficient dn/dT and the temperature change ΔT (i.e. Δn=(dn/dT)ΔT) so that the phase shift ΔΦ can be expressed as:

$$\Delta\phi = \frac{2\pi}{\lambda}\frac{dn}{dT}\int_0^L \Delta T(z)\,dz$$

where the integral in the above equation accounts for any non-uniform temperature change by integrating over the length L of the optical waveguide 16 where the refractive index change Δn occurs. As previously mentioned, in silicon the thermo-optic coefficient dn/dT is relatively large (dn/dT=2.2×10$^{-4}$° C.$^{-1}$) so that an index change Δn=0.09 can be produced by a temperature change ΔT=400° C. This temperature change, if uniformly applied along the length L of the optical waveguide 16 would produce a π-phase change (i.e. ΔΦ=180°) over a length L=8.5 μm. In practice, a somewhat longer length of the optical waveguide 16 will be needed since the temperature change produced by the electrical heater in the waveguide bend 68 will generally be non-uniform.

A finite element thermal simulation of the optical waveguide device of FIGS. 7A and 7B in which the optical waveguide 16 is encapsulated within layers 36 and 38 of a low-thermal-conductivity material (silica) indicates that, to achieve an average temperature change ΔT=200° C. and thereby provide a π-phase change over a device 10 having a bend radius of R=2.75 μm with an overall length of the waveguide bend 68 being L=2πR=17.3 μm, an electrical power of about 11 mW will need to be applied to the impurity-doped region 70. The finite element thermal simulation also indicates that this temperature change can be achieved with a thermal time constant of less than one microsecond. In other embodiments of the present invention where the optical waveguide 16 in the device 10 of FIG. 7A supported upon a pedestal 30 as shown in FIG. 3B and maintained under vacuum, the finite element thermal simulation indicates that the electrical power needed to produce the π-phase change can be reduced to about 4 mW.

The optical waveguide apparatus 10 of FIGS. 7A and 7B can also be used as an optical delay line to provide a variable time delay Δt in the light 100 being transmitted through the optical waveguide 16. The variable time delay Δt can be expressed as:

$$\Delta t = \frac{\Delta n L}{c}$$

where Δn is the effective refractive index change over the length L of the optical waveguide 16 and c is the speed of light.

The advantages of directly heating the waveguide bend 68 using the impurity-doped region 70 located therein are similar to those which have been previously described for the optical waveguide device of FIGS. 2A and 2B. By integrating the impurity-doped region 70 into the waveguide bend 68, any heating provided by the impurity-doped region 70 will be substantially confined within the waveguide bend 68. This will minimize any thermal spreading and thereby will minimize both the electrical power and the thermal time constant for changing the effective index of refraction using the thermo-optic effect. This will also reduce or eliminate any thermal cross-talk between a plurality of optical waveguide devices 10 located on a common substrate 12, and will allow the devices 10 to be more closely spaced together to save space on the substrate 12.

To thermally isolate the optical waveguide 16, the waveguide 16 can be formed over a layer 36 of a low-thermal-conductivity material such as silicon dioxide or a silicate glass (e.g. TEOS) as shown in FIG. 7B and as previously described with reference to FIGS. 2A and 2B. After formation of the impurity-doped region 70 by doping a portion of the waveguide bend 68 by ion implantation or thermal diffusion, a second layer 38 of the low-thermal-conductivity material can be deposited over the optical waveguide 16 to encapsulate the optical waveguide 16 and to provide a support for the connecting members 22 and the wiring 40 used to supply the voltage to the impurity-doped region 70. Openings 42 can then be formed down through the second layer 38 and filled with a deposited metal via 44 to connect the wiring 40 to the connecting members 22 as previously described with reference to FIGS. 2A and 2B.

In other embodiments of the present invention, the optical waveguide 16 can be supported on a pedestal 30 for thermal isolation as previously described with reference to FIGS. 1A, 1B and 3A, 3B. This can be done, for example, when the optical waveguide device 10 is formed from a silicon-on-insulator (SOI) substrate in a manner similar to that previously described with reference to FIGS. 3A and 3B. The SOI substrate comprises a monocrystalline silicon body which can be used to form the substrate 12 in the completed device 10 of FIG. 7A. The SOI substrate also comprises a monocrystalline silicon layer which can be used to form the optical waveguide 16 including the waveguide bend 68. The SOI substrate also includes a silicon oxide layer which can be used to form the pedestal 30 and also to form a support 46 for the wiring 40 and the connecting members 22 which can be formed as an air bridge. The monocrystalline silicon layer can be, for example, about 0.25 μm thick when the light 100 is at a wavelength of about 1.5 μm; and the silicon oxide layer can be, for example, 1-3 μm thick.

The optical waveguide 16 in the device 10 of FIGS. 7A and 7B can comprise, for example, silicon or silicon nitride. When silicon nitride is used for the optical waveguide 16, the impurity-doped region 70 can comprise silicon (e.g. monocrystalline silicon or polycrystalline silicon) depending upon whether the impurity-doped region 70 is formed from the monocrystalline silicon layer of an SOI substrate, or whether the impurity-doped region 70 is formed from a layer of polycrystalline silicon deposited by CVD.

Figure 8:
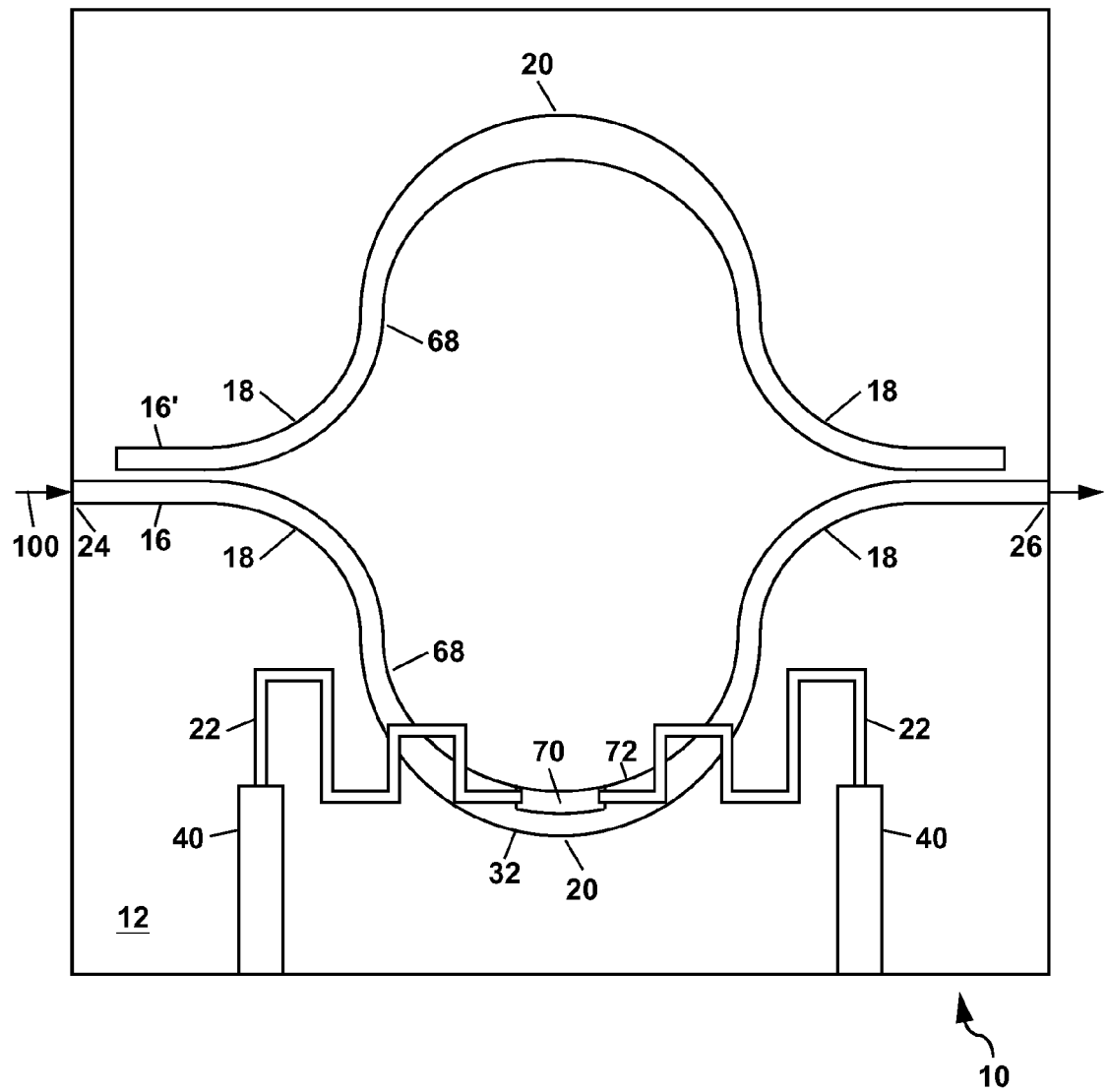
FIG. 8 shows a schematic plan view of an eighth example of an optical waveguide apparatus according to the present invention.

To form an interferometer using the optical waveguide device 10 of FIGS. 7A and 7B, another optical waveguide 16' can be located on the substrate 12 adjacent to the optical waveguide 16 as shown in the schematic plan view of FIG. 8. Each of the optical waveguides 16 and 16' can have a waveguide bend 68 therein to provide about the same optical path in the absence of any voltage being applied to the impurity-doped region 70. The optical waveguide 16' in FIG. 8 is shown with an adiabatically-varying width for the waveguide bend 68, although in other embodiments of the present invention, the optical waveguide 16' can have a uniform width throughout.

The two optical waveguides 16 and 16' can be optically coupled together at opposite ends of the waveguides 16 and 16' to form a Mach-Zehnder interferometer which can be used, for example, as a modulator or switch. This can be done using evanescent coupling as shown in FIG. 8, or alternately by using other types of waveguide couplers known to the art including branching waveguide Y-couplers and multi-mode interference (MMI) couplers. Those skilled in the art will understand that other types of interferometers can be formed using the optical waveguide apparatus 10 of the present invention, including delta-beta (Δ-β) interferometers.

Evanescent coupling can be provided in the device 10 of FIG. 8 by locating the optical waveguides 16 and 16' closely together (e.g. about 0.15-0.35 μm apart) at the each end where the waveguides 16 and 16' are to be optically coupled together. The evanescent coupling splits the input light 100 between the two optical waveguides 16 and 16', and then recombines the light 100 near the output port 26. In the absence of any voltage applied to the impurity-doped region 70, the light 100 will be in phase in each optical waveguide 16 and 16' and will be transmitted through the interferometer. However, when a voltage is applied to the impurity-doped region 70, the light 100 in the waveguide 16 will undergo a phase shift ΔΦ which will affect the transmission of the light 100 through the interferometer. With a π-phase shift, the light 100 from each waveguide 16 and 16' will recombine destructively so that none of the light 100 will appear at the output port 26. Thus, the transmission of the light 100 through the device 10 of FIG. 8 can be controlled by the voltage applied to the impurity-doped region 70 so that the device 10 can be used as an optical modulator or switch.

In the optical waveguide device 10 of FIG. 8, each optical waveguide 16 and 16' can have a minimum width 18 of, for example, 0.4-0.45 μm and a maximum width 20 which is about twice the minimum width 18. Each optical waveguide 16 can also have a thickness of, for example, 0.25-0.26 μm. The bend radius of the waveguide bend 68 can be on the order of a few microns or more (e.g. 2-20 μm).

The variable phase shift ΔΦ can be provided in the interferometer of FIG. 8 as described previously with the impurity-doped region 70 either forming an electrical heater, or forming a semiconductor junction. A semiconductor junction can be provided in the impurity-doped region 70 by forming therein a p-type-doped region 50 and an n-type-doped region 52 as previously described herein. These doped regions 50 and 52 can be arranged vertically to form a vertical semiconductor junction 48 in a manner similar to that previously described with reference to FIGS. 4A and 4B. Alternately, the doped regions 50 and 52 can be arranged horizontally and longitudinally spaced apart along the length of the waveguide bend 68 to form a horizontal semiconductor junction 66 similar to that previously described with reference to FIGS. 6A and 6B.

Figure 9:
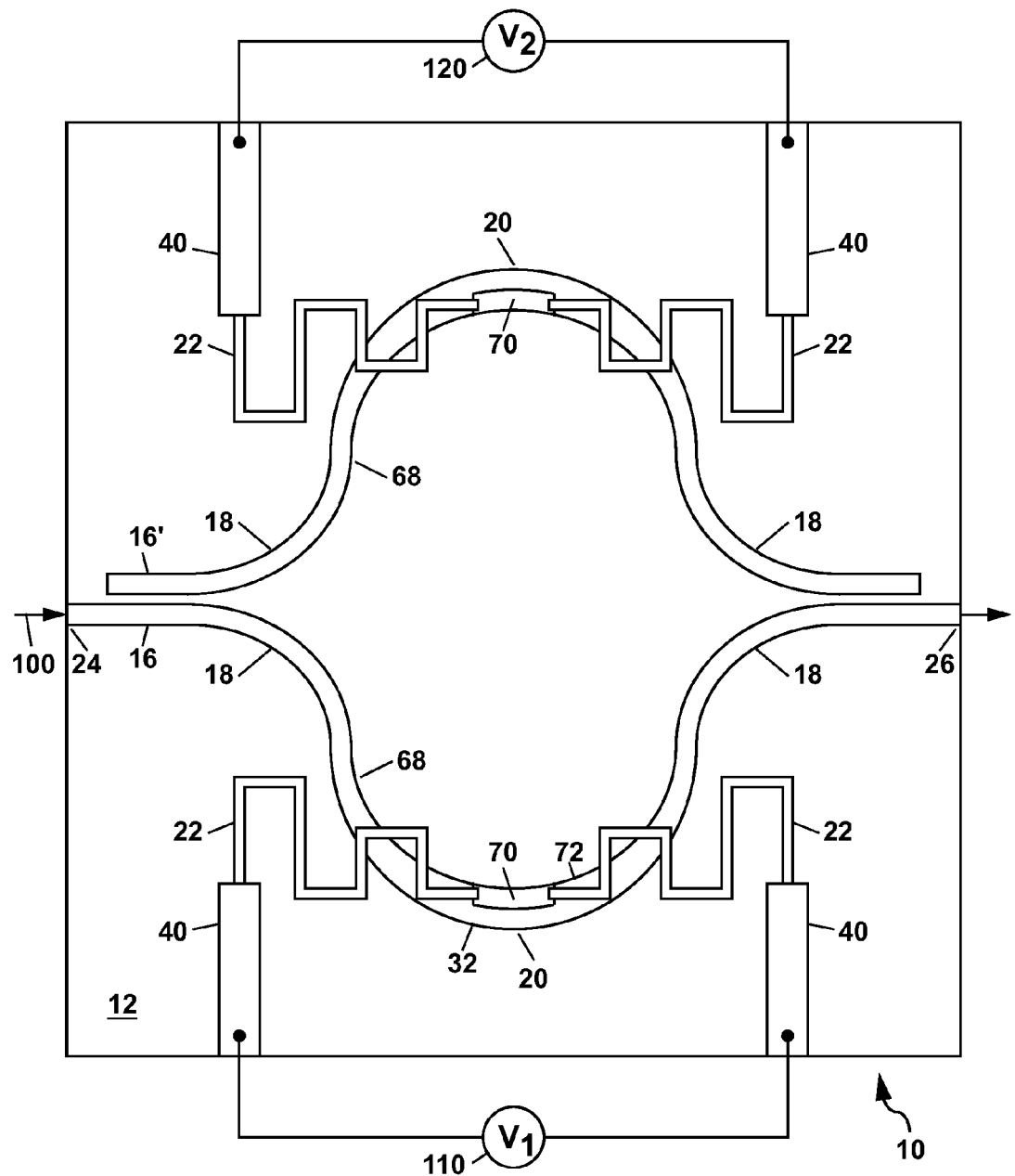
FIG. 9 shows a schematic plan view of a ninth example of an optical waveguide apparatus according to the present invention.

Although the example of FIG. 8 shows only a single impurity-doped region 70, those skilled in the art will understand that a plurality of impurity-doped regions 70 can be provided in the waveguide bend 68 of the optical waveguide 16 to increase the phase shift ΔΦ in the interferometer. One or more impurity-doped regions 70 can also be provided in the optical waveguide 16' as shown in FIG. 9. The provision of the impurity-doped regions 70 in the optical waveguide 16' is especially useful when the impurity-doped regions 70 contain a vertical semiconductor junction 48 or a horizontal semiconductor junction 66 therein. In this case, the semiconductor junction 48 or 66 in the optical waveguide 16' can be biased with an opposite polarity from the semiconductor junction 48 or 66 in the optical waveguide 16 to provide a push-pull operation of the device 10.

As an example, a vertical semiconductor junction 48 formed in the impurity-doped region 70 of the optical waveguide 16 can be forward-biased using a first voltage $V_1$ to inject carriers into the waveguide bend 70 in the optical waveguide 16 and thereby decrease the index of refraction Δn in the optical waveguide 16. At the same time, another vertical semiconductor junction 48 formed in the impurity-doped region 70 of the optical waveguide 16' can be reverse-biased with a second voltage $V_2$ to deplete carriers from the waveguide bend 70 in the optical waveguide 16' and thereby increase the index of refraction Δn in the optical waveguide 16'. In this example, by oppositely biasing the vertical semiconductor junctions 48 in the two optical waveguides 16 and 16', a much larger phase shift ΔΦ can be produced as compared to biasing only the vertical semiconductor junction 48 in the optical waveguide 16. A similar effect can be produced when the device 10 of FIG. 9 includes a horizontal semiconductor junction 66 formed in the impurity-doped region 70 of each optical waveguide 16 and 16'.

In the example of FIG. 9, separate electrical connections are made to each impurity-doped region 70 using the wiring 40 and connecting members 22. This allows the use of different bias voltage sources 110 and 120 to be used to supply the voltages $V_1$ and $V_2$ for actuation of the impurity-doped region 70 in each optical waveguide 16 and 16'. In other embodiments of the present invention, a single pair of electrical connections can be provided to the impurity-doped regions 70 of both optical waveguides 16 and 16' so that a single bias voltage source can be used. This can be done, for example, by connecting the p-type-doped region 50 of the optical waveguide 16 to the n-type-doped region 52 of the optical waveguide 16', and by connecting the n-type-doped region 52 of the optical waveguide 16 to the p-type-doped-region 50 of the optical waveguide 16'. With this electrical connection, the single bias voltage source can forward bias the semiconductor junction in the optical waveguide 16 and, at the same time, reverse bias the semiconductor junction in the optical waveguide 16'.

Figure 10:
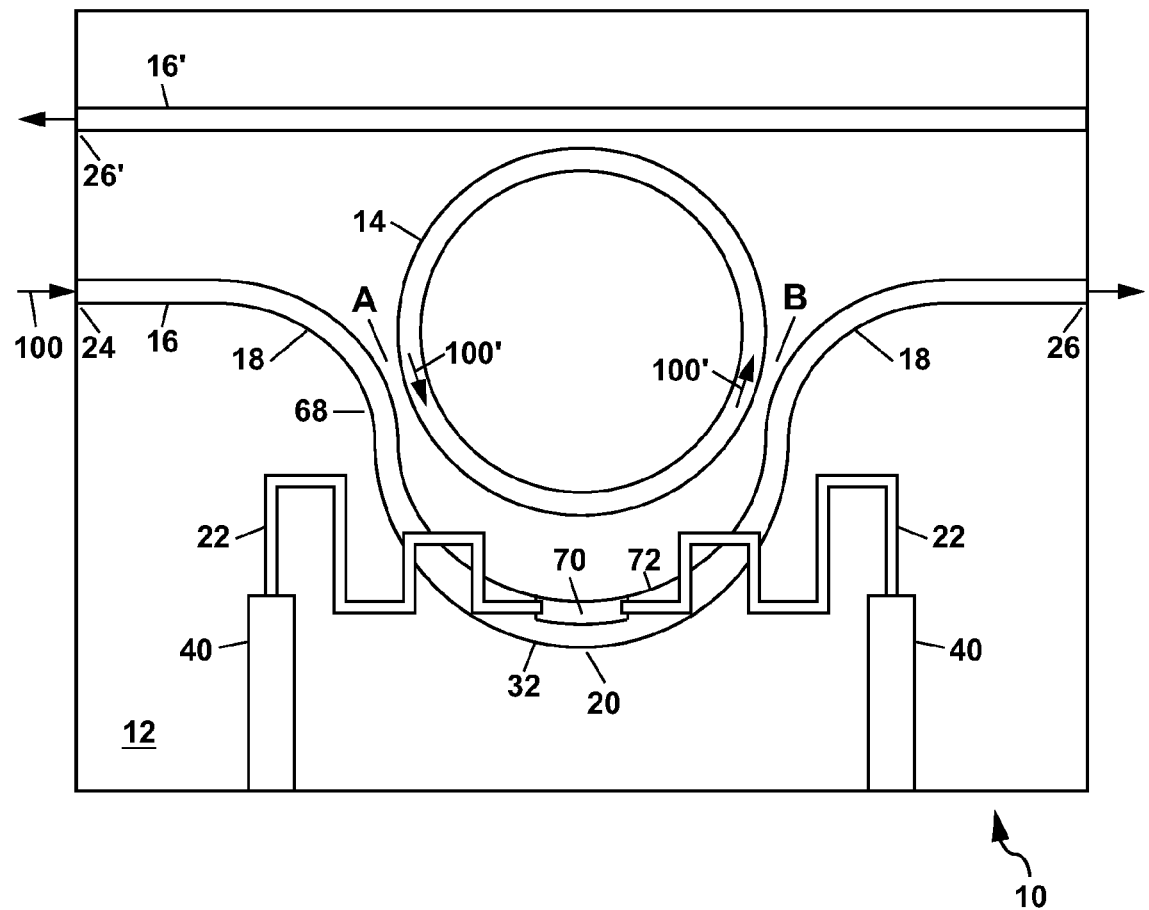
FIG. 10 shows a schematic plan view of a tenth example of an optical waveguide apparatus according to the present invention.

FIG. 10 schematically illustrates in plan view a tenth example of the optical waveguide apparatus 10 of the present invention. In FIG. 10, an optical waveguide 16 having a waveguide bend 68 therein is evanescently coupled to a ring resonator 14 and therefrom to another optical waveguide 16'. The evanescent coupling of the light 100 from the optical waveguide 16 into the ring resonator 14 occurs at two different points labelled "A" and "B" in FIG. 10. At these two points "A" and "B" the optical waveguide 16 and the ring resonator 14 can have waveguide widths which are substantially equal to the minimum width 18 so that waveguiding of the light 100 in the waveguide 16 and a portion of the light 100' which is coupled into the ring resonator 14 and is at a resonant frequency thereof will occur with the light 100 and 100' being in a fundamental guided-wave mode.

The exact amount of the light 100' which will circulate as resonant light in the ring resonator 14 will depend upon the relative optical phases Φ of the light 100 in the optical waveguide 16 and the light 100' in the ring resonator 14 at the points "A" and "B." At point "A" a portion of the light 100 will be coupled from the waveguide 16 into the ring resonator 14 to form the resonant light 100' which will then circulate around the ring resonator 14 in a counter-clockwise direction as shown in FIG. 10 until the resonant light 100' reaches point "B." At point "B" an evanescent coupling between the resonant light 100' in the ring resonator 14 and the remaining light 100 in the optical waveguide 16 will occur; and the strength of the evanescent coupling between the ring resonator 14 and the optical waveguide 16 will depend upon the relative phases Φ of the light 100 and 100' since the ring resonator 14 and the optical waveguide 16 will form an interferometer. The relative phases Φ of the light 100 and 100' in the optical waveguide 16 and the ring resonator 14, respectively, can be controlled and varied using the impurity-doped region 70 which can provide a variable phase shift ΔΦ of the light 100 in the optical waveguide 16. Depending upon the phase shift ΔΦ of the light 100 in the optical waveguide 16, a portion or all of the light 100 can be coupled either to the output port 26 of the optical waveguide 16, or through the ring resonator 14 and to an output port 26' of the adjacent optical waveguide 16'. Thus, the device 10 of FIG. 10 can be used to form an optical switch. The device 10 of FIG. 10 can also be used as an optical filter since the coupling of the light 100 into and through the ring resonator 14 will depend upon the light 100 being at a frequency which is resonant with the ring resonator 14. The device 10 of FIG. 10 can also be used as an optical modulator by modulating the phase shift ΔΦ produced by the impurity-doped region 70.

Fabrication of the optical waveguide devices 10 described herein is compatible with conventional CMOS IC fabrication so that electronic circuitry can be fabricated on the same substrate 12 as the optical ring resonator devices 10. This can allow, for example, the devices 10 of the present invention to be used for high-speed data transmission and signal routing in multi-cored microprocessors.

The matter set forth in the foregoing description and accompanying drawings is offered by way of illustration only and not as a limitation. The actual scope of the invention is intended to be defined in the following claims when viewed in their proper perspective based on the prior art.

What is claimed is:
1. An optical waveguide apparatus, comprising:
   a silicon nitride optical waveguide having a waveguide bend therein, with the waveguide bend having a width which adiabatically varies with distance between a minimum value of the width proximate to a pair of opposite ends of the waveguide bend and a maximum value of the width proximate to a midpoint of the waveguide bend;

impurity-doped region comprising monocrystalline silicon or polycrystalline silicon located inside of the silicon nitride optical waveguide at a location proximate to the maximum value of the width of the waveguide bend, with the impurity-doped region extending from an inner sidewall of the optical waveguide only partway through the width of the optical waveguide, to change an effective index of refraction within the waveguide bend in response to a voltage applied to the impurity-doped region; and at least one connecting member silicon nitride optical waveguide proximate to the midpoint of the waveguide bend to provide the voltage to the impurity-doped region.

2. An optical waveguide apparatus, comprising:

an optical waveguide comprising monocrystalline silicon and having a waveguide bend therein, with the waveguide bend having a width which adiabatically varies with distance between a minimum value of the width proximate to a pair of opposite ends of the waveguide bend and a maximum value of the width proximate to a midpoint of the waveguide bend, and with the optical waveguide having an impurity-doped region wherein the monocrystalline silicon inside of the optical waveguide is doped at least one impurity dopant to change an effective index of refraction within the optical waveguide in response to a voltage applied to the impurity-doped region, and than the impurity-doped region being located proximate to the maximum value of the width of the waveguide bend and extending from an inner sidewall of the optical waveguide only partway across the width of the optical waveguide; and at least one connecting member attached to the optical waveguide proximate to the midpoint of the waveguide bend to provide the voltage to the impurity-doped region of the monocrystalline silicon.

3. The apparatus of claim 2 wherein the impurity-doped region forms an electrical heater.

4. The apparatus of claim 2 wherein the impurity-doped region comprises an n-type-doped region and a p-type-doped region to form a semiconductor junction.

5. The apparatus of claim 2 further comprising another optical waveguide, with the two optical waveguides being optically coupled together to form an interferometer.

6. The apparatus of claim 2 further comprising a substrate whereon the optical waveguide is supported.

7. The apparatus of claim 6 wherein the optical waveguide is supported above the substrate on a pedestal.

8. The apparatus of claim 6 wherein the optical waveguide is located within a low-thermal-conductivity material comprising silicon dioxide or a silicate glass.

9. The apparatus of claim 2 further comprising a silicon-on-insulator substrate which comprises a monocrystalline silicon body and a monocrystalline silicon layer sandwiched about a silicon oxide layer, with the optical waveguide being formed from the monocrystalline silicon layer.

10. The apparatus of claim 5 wherein the interferometer is a Mach-Zehnder interferometer.

11. An optical waveguide apparatus, comprising
a substrate;
an optical waveguide supported on the substrate, with the optical waveguide having a waveguide bend therein, and with the waveguide bend having a width which varies adiabatically with distance along the waveguide bend between a minimum value of the width and a maximum value of the width;

an impurity-doped region located within the waveguide bend at a location proximate to the maximum value of the width of the waveguide bend and proximate to an inner sidewall of the waveguide bend, with the impurity-doped region extending only partway across the width of the waveguide bend from the inner sidewall thereof; and a pair of electrical contacts connected to the impurity-doped region to provide a voltage thereto to change an effective index of refraction of light within the optical waveguide.

12. The apparatus of claim 11 wherein the optical waveguide comprises monocrystalline silicon or silicon nitride.

13. The apparatus of claim 11 wherein the substrate comprises a silicon-on-insulator substrate which comprises a monocrystalline silicon body and a monocrystalline silicon layer sandwiched about a silicon oxide layer, with the optical waveguide being formed from the monocrystalline silicon layer.

14. The apparatus of claim 11 wherein the impurity-doped region forms an electrical heater.

15. The apparatus of claim 11 wherein the impurity-doped region comprises a p-type-doped region and an n-type-doped region superposed one above the other to form a vertical semiconductor junction.

16. The apparatus of claim 11 wherein the impurity-doped region comprises a p-type-doped region and an n-type-doped region spaced longitudinally along the waveguide bend to form a horizontal semiconductor junction.

17. The apparatus of claim 11 further comprising another optical waveguide, with the two optical waveguides being optically coupled together to form an interferometer.

18. An optical waveguide apparatus, comprising:

a pair of optical waveguides which are optically coupled together to form an interferometer, with at least one of the pair of optical waveguides of further comprising a waveguide bend therein which has a width that varies adiabatically with distance between a minimum value and a maximum value and with an impurity-doped region being formed within the waveguide bend at a location proximate to the maximum value of the width thereof and extending only partway into the waveguide bend from an inner sidewall thereof; and a pair of electrical contacts connected to the impurity-doped region to provide a variable phase shift in the interferometer in response to a voltage applied to the impurity-doped region.

19. The apparatus of claim 18 wherein each optical waveguide comprises monocrystalline silicon or silicon nitride.

20. The apparatus of claim 18 wherein the pair of optical waveguides are supported within a low-thermal-conductivity material comprising silicon dioxide or a silicate glass.

21. The apparatus of claim 18 further comprising a substrate whereon the pair of optical waveguides are supported.

22. The apparatus of claim 18 wherein the impurity-doped region forms an electrical heater.

23. The apparatus of claim 18 wherein the impurity-doped region comprises an n-type-doped region and a p-type-doped region to form a semiconductor junction.

* * * * *